US009423520B2

(12) United States Patent
Voldsbekk

(10) Patent No.: US 9,423,520 B2
(45) Date of Patent: Aug. 23, 2016

(54) RIGID PROTRACTED GEOPHYSICAL EQUIPMENT COMPRISING CONTROL SURFACES

(71) Applicant: PGS Geophysical AS, Lysaker (NO)

(72) Inventor: Rune Sindre Voldsbekk, Drammen (NO)

(73) Assignee: PGS Geophysical AS, Oslo (NO)

( * ) Notice: Subject to any disclaimer, the term of this patent is extended or adjusted under 35 U.S.C. 154(b) by 361 days.

(21) Appl. No.: 13/949,999

(22) Filed: Jul. 24, 2013

(65) Prior Publication Data

US 2014/0185409 A1 Jul. 3, 2014

Related U.S. Application Data

(60) Provisional application No. 61/746,676, filed on Dec. 28, 2012.

(51) Int. Cl.
*G01V 1/38* (2006.01)

(52) U.S. Cl.
CPC .................... *G01V 1/3826* (2013.01)

(58) Field of Classification Search
CPC .......... G01V 1/20; G01V 1/38; G01V 1/3826
See application file for complete search history.

(56) References Cited

U.S. PATENT DOCUMENTS

| | | | | |
|---|---|---|---|---|
| 3,943,483 A * | 3/1976 | Strange | ............. | G01V 1/3826 114/245 |
| 4,781,140 A | 11/1988 | Bell et al. | | |
| 6,011,752 A * | 1/2000 | Ambs | ............. | G01V 1/3826 114/242 |
| 6,459,653 B1 * | 10/2002 | Kuche | ............. | B63B 21/66 114/245 |
| 6,775,204 B2 | 8/2004 | Scott | | |
| 6,903,998 B2 | 6/2005 | Vaage | | |
| 7,028,988 B2 | 4/2006 | Scott | | |
| 7,142,481 B1 | 11/2006 | Metzbower et al. | | |
| 7,167,412 B2 | 1/2007 | Tenghamn | | |
| 7,221,619 B1 | 5/2007 | George | | |
| 7,260,024 B2 | 8/2007 | Goujon et al. | | |
| 7,298,672 B1 | 11/2007 | Tenghamn et al. | | |
| 7,352,654 B2 | 4/2008 | Goujon et al. | | |
| 7,426,439 B2 | 9/2008 | Ozdemir et al. | | |
| 7,468,932 B2 | 12/2008 | Tenghamn | | |

(Continued)

FOREIGN PATENT DOCUMENTS

| | | |
|---|---|---|
| GB | 2426051 A | 11/2006 |
| WO | WO02/29948 A1 | 4/2002 |

(Continued)

OTHER PUBLICATIONS

Frederick T. Wallenberger et al., Glass Fibers, ASM Handbook, 2001, pp. 27-34, vol. 21: Composites.

(Continued)

*Primary Examiner* — Luke Ratcliffe
*Assistant Examiner* — Hovhannes Baghdasaryan

(57) ABSTRACT

Disclosed are rigid protracted geophysical equipment that comprise control surfaces and associated methods of use in marine geophysical surveys. An apparatus for use in a marine geophysical survey comprising: rigid protracted geophysical equipment having a ratio of length to a largest dimension of width or height of about 1000:1 or more, wherein the rigid protracted geophysical equipment comprises control surfaces for controlling movement of the rigid protracted geophysical equipment when towed through a body of water.

27 Claims, 20 Drawing Sheets

(56) References Cited

U.S. PATENT DOCUMENTS

| | | | |
|---|---|---|---|
| 7,641,421 B2 | 1/2010 | Roodenburg et al. | |
| 7,737,698 B2 | 6/2010 | Tenghamn et al. | |
| 7,778,114 B2 | 8/2010 | Goujon et al. | |
| 7,800,976 B2 | 9/2010 | Stokkeland et al. | |
| 7,834,632 B2 | 11/2010 | Tenghamn et al. | |
| 7,974,152 B2 | 7/2011 | Tenghamn | |
| 8,021,080 B2 | 9/2011 | Frivik et al. | |
| 8,267,031 B2 | 9/2012 | Austad | |
| 8,319,497 B2 | 11/2012 | Sudow et al. | |
| 2006/0126432 A1* | 6/2006 | Hoogeveen | G01V 1/201 367/20 |
| 2007/0258320 A1* | 11/2007 | Harrick | G01V 1/201 367/20 |
| 2007/0258321 A1* | 11/2007 | Tenghamn | G01V 1/201 367/20 |
| 2007/0266804 A1 | 11/2007 | Goujon et al. | |
| 2008/0192570 A1 | 8/2008 | Tenghamn et al. | |
| 2008/0267009 A1 | 10/2008 | Frivik et al. | |
| 2009/0092006 A1* | 4/2009 | Teigen | G01V 1/36 367/19 |
| 2009/0161487 A1 | 6/2009 | Kjellgren et al. | |
| 2009/0211509 A1* | 8/2009 | Olivier | G01V 1/3826 114/244 |
| 2010/0165792 A1 | 7/2010 | Stenzel et al. | |
| 2010/0322565 A1 | 12/2010 | George et al. | |
| 2011/0248718 A1 | 10/2011 | Sudow et al. | |
| 2012/0081994 A1 | 4/2012 | Huson et al. | |
| 2013/0010570 A1 | 1/2013 | Sudow et al. | |
| 2013/0010571 A1 | 1/2013 | Sudow et al. | |
| 2013/0088937 A1 | 4/2013 | Sykes et al. | |
| 2014/0185410 A1 | 7/2014 | Voldsbekk | |
| 2014/0185411 A1 | 7/2014 | Voldsbekk | |
| 2014/0185412 A1 | 7/2014 | Voldsbekk | |
| 2014/0254310 A1 | 9/2014 | Voldsbekk | |

FOREIGN PATENT DOCUMENTS

| | | |
|---|---|---|
| WO | WO2004/036252 A1 | 4/2004 |
| WO | WO2004/079398 A1 | 9/2004 |

OTHER PUBLICATIONS

Search Report Issued in the United Kingdom Intellectual Property Office for application GB1322653.5, mailed May 22, 2014, 4 pages.

* cited by examiner

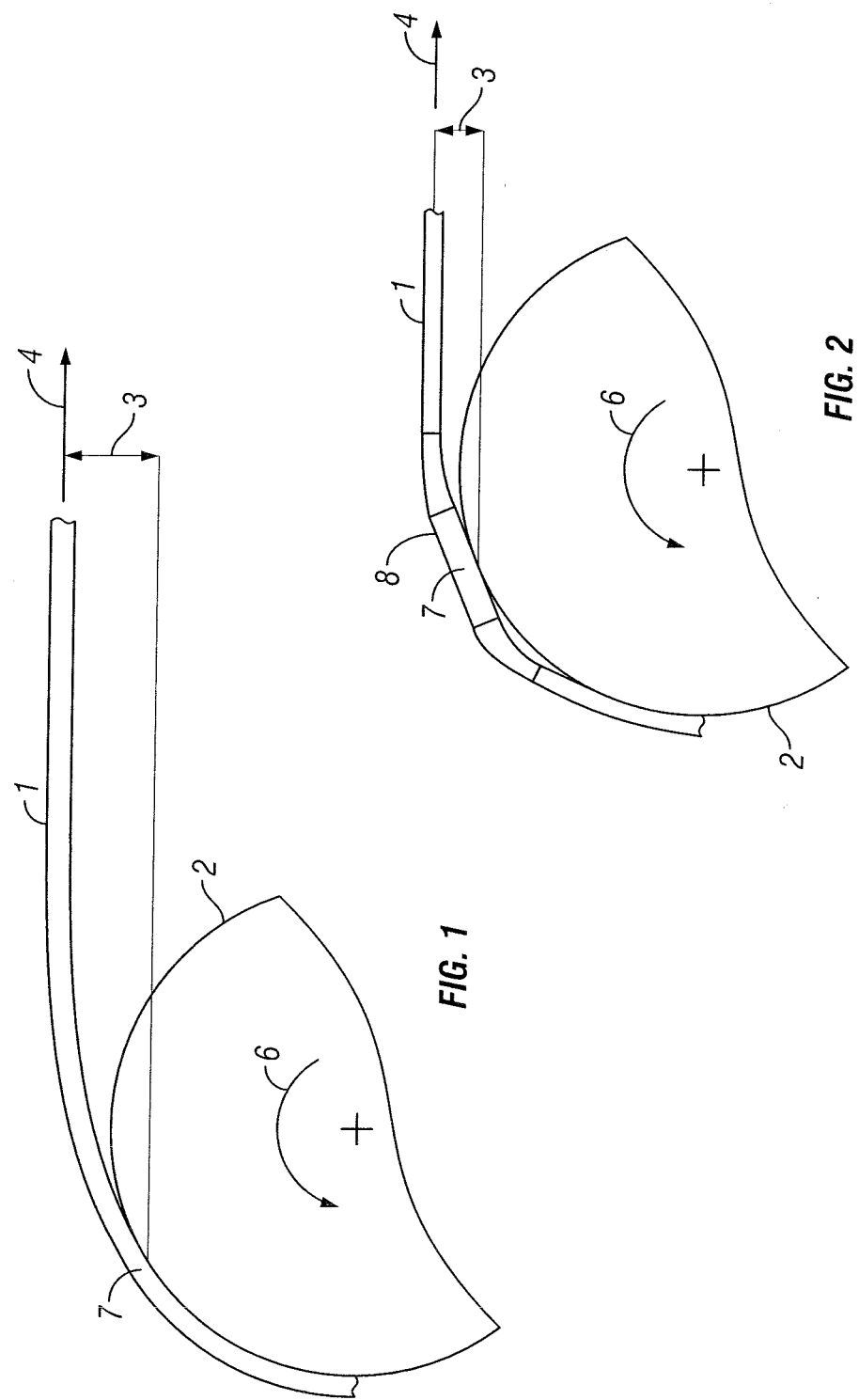

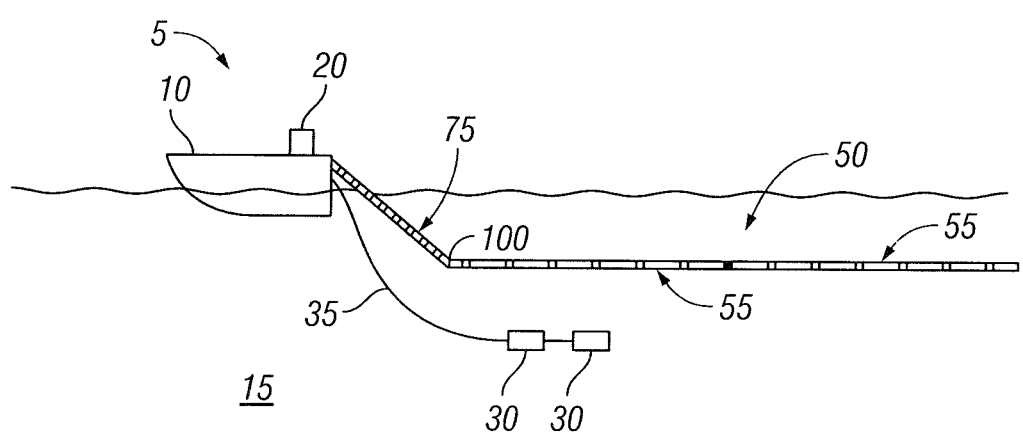
FIG. 5

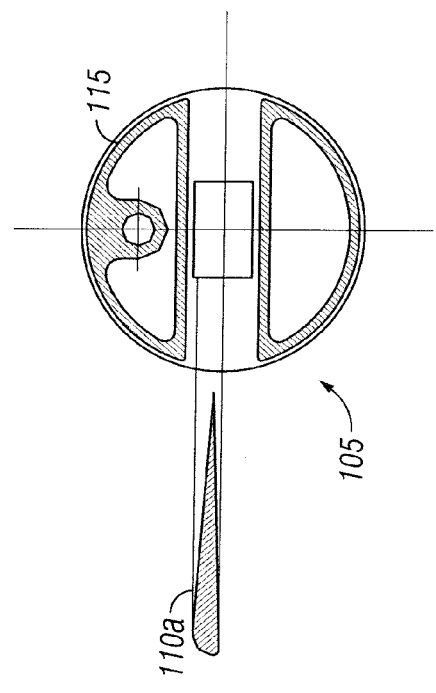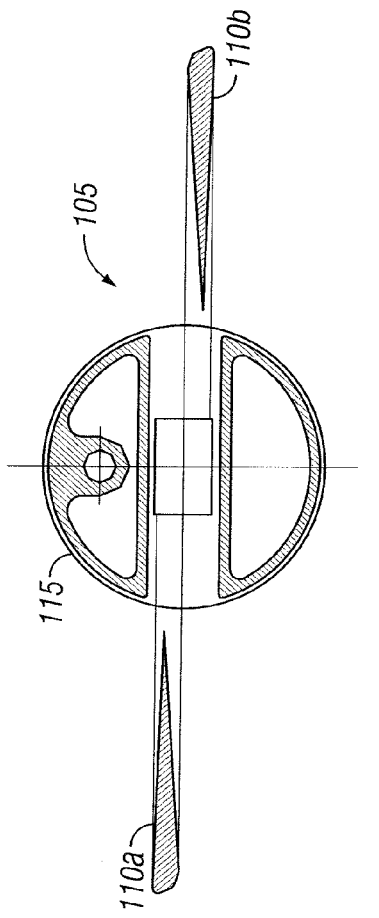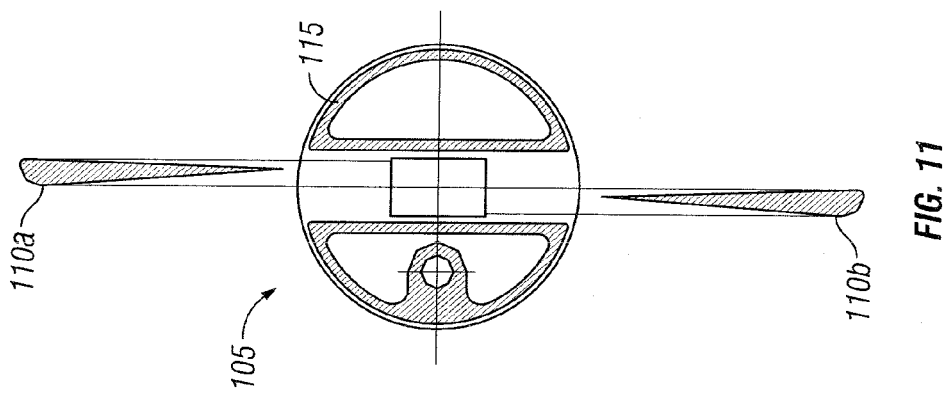

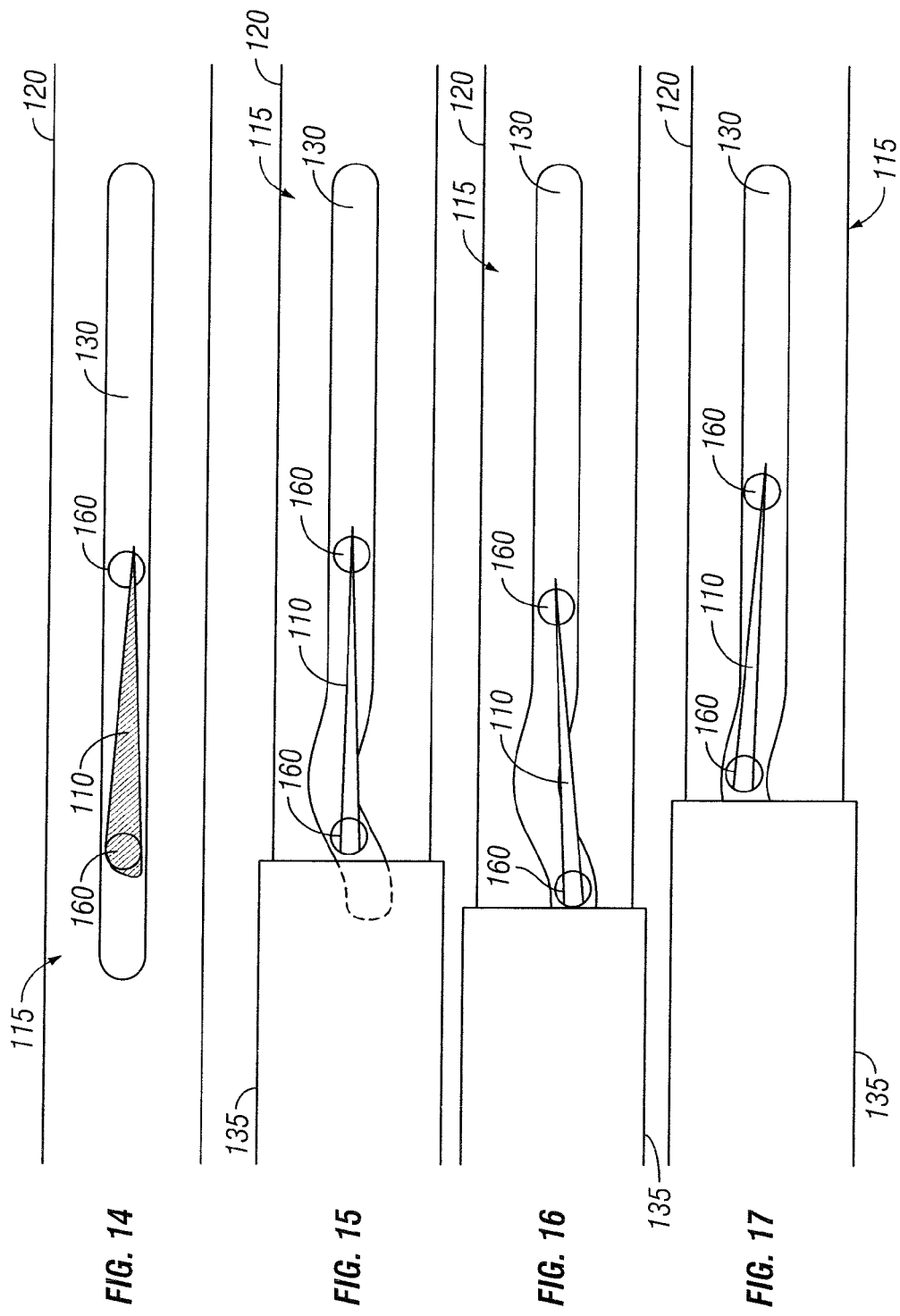

RIGID PROTRACTED GEOPHYSICAL EQUIPMENT COMPRISING CONTROL SURFACES

CROSS-REFERENCE TO RELATED APPLICATIONS

The present application claims the benefit of U.S. Provisional Application No. 61/746,676, filed Dec. 28, 2012, entitled "Steerable Rigid-Stem Survey Method and System," the entire disclosure of which is incorporated herein by reference.

BACKGROUND

The present invention relates generally to the field of marine surveying. More particularly, in one or more embodiments, this invention relates to rigid protracted geophysical equipment that comprise control surfaces and associated methods of use in marine geophysical surveys.

Techniques for marine surveying include marine geophysical surveying, such as seismic surveying and electromagnetic ("EM") surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more geophysical sensor streamers also may be towed in the water at selected depths by the same or a different vessel. The streamers are typically cables that include a plurality of sensors disposed thereon at spaced apart locations along the length of the cable. The sensors may be configured to generate a signal that is related to a parameter being measured by the sensor. At selected times, the energy source may be actuated to generate, for example, seismic or EM energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

In geophysical surveying, the geophysical equipment, such as the streamers, are typically cables that are stored on a drum. The streamers are typically made of multiple components, such as electrical conductors, fiber optics, and stress-supporting members, all bundled together and covered with a protective outer skin. The streamer may be up to several kilometers in length. A lead-in is another usual part of geophysical equipment. The lead-in is typically a cable that couples the streamer to the survey vessel and may be stored on a drum, typically the same drum as the streamer. To deploy, retrieve, and store this geophysical equipment, cable-handling systems are typically employed. Such cable-handling systems may include a storage drum in combination with sheaves, blocks, and other turns where a smaller angle of cable direction changes occurs. Drums—often with a smaller diameter—can be used to take off individual sections of the streamer for repair or replacement. In operation, one of the drums is holding back the tension in the deployed cable with its turning moment. In order to avoid load concentration on the cable, it may be beneficial to have many rounds of cable inside the drum while applying force. Thus, the innermost drum, which is the storage drum, is often used to hold back the tension.

The drum causes a number of restrictions and costly features on the geophysical equipment, especially in combination with rigid elements such as connectors, electronics housing, and sensor spacers. For example, the streamer typically should be capable of handling large deformations as a result of storage on the drums, thus limiting the available alternatives for the outer skin of the streamer. Accordingly, options for treating the geophysical equipment for drag reduction and antifouling may be limited. In addition, certain geophysical equipment, such as gel-filled cables, may encounter large, undesired deformations in shape due to storage on the drum, preventing their re-use. For various reasons, some of the components of the geophysical equipment may be external to the cable and attached via connection points to the outside. These external components typically cannot be attached to the cable until the cable is unwound from the drum during deployment. To reduce the complexity associated with this attachment process, there has been an ongoing effort to place these components inside the outer skin of the cable. However, placement of the equipment inside the outer skin is not always practical as adapting a solution for incorporating these components into a cable that is wound onto a drum can be challenging.

In some instances, it may be desirable to control the position of this geophysical equipment, such as lead-ins and streamers, in both the vertical and lateral direction. Control of position may be desirable for a number of reasons, including noise reduction, efficient towing, bin accuracy, and depth/ghost accuracy. Control of rotation of the geophysical equipment may also be useful in some applications. For control of position and/or rotation, wings have been used. Typically, the wings may be mounted on the geophysical equipment at deployment and taken off during retrieval. While the wings may be used for position and/or rotation control, their use may have drawbacks. For example, implantation of wings into the streamers may cause increased noise. In particular, as the streamers may typically be soft, elastic structures, such as cables, the lateral force of the wings may cause streamer deformation generating noise due to crossflow caused by deformations at the intersection of the wings and the streamer. Another drawback that may be associated with wings is exposure to marine growth in the water may cause increased wear and reduce their useful lifespan. Yet another drawback that may be associated with wings is increased crew work load and hazardous operations due to requirement of manual interaction at deployment and retrieval for mounting and removal of the wings. Moreover, additional space may also be required on the vessel for *separate* wing storage.

Accordingly, there is a need for improved streamers and other seismic equipment that can have position and/or rotation control.

BRIEF DESCRIPTION OF THE DRAWINGS

These drawings illustrate certain aspects of some of the embodiments of the present invention and should not be used to limit or define the invention.

FIG. 1 illustrates winding of geophysical equipment onto a drum.

FIG. 2 illustrates winding of a cable comprising rigid protracted geophysical equipment onto a drum in accordance with an example embodiment.

FIG. 4 illustrates an example embodiment of a marine geophysical survey system using a rigid lead-in.

FIG. 5 illustrates another example embodiment of a marine geophysical survey system using a rigid lead-in and a rigid sensor streamer.

FIGS. 11-13 illustrate example embodiments of different wings configurations for use on rigid protracted geophysical equipment.

FIGS. 14-17 illustrate example embodiments of using a sleeve to control wing angle.

DETAILED DESCRIPTION

Figure 3:
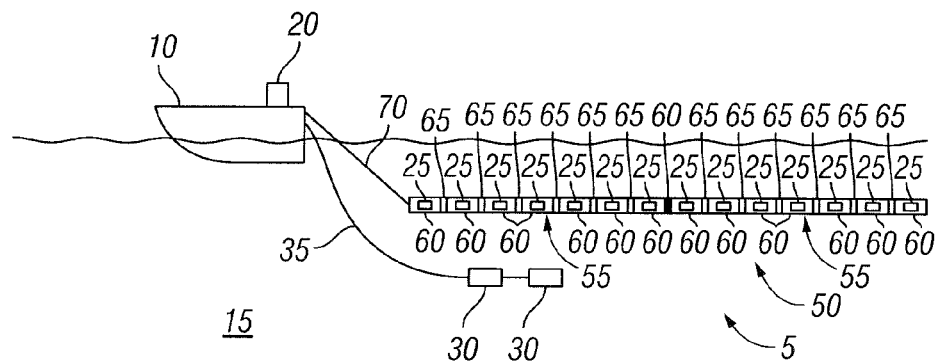
FIG. 3 illustrates an example embodiment on a marine geophysical survey system using a rigid sensor streamer.

The present invention relates generally to the field of marine surveying. More particularly, in one or more embodiments, this invention relates to rigid protracted geophysical equipment that comprise control surfaces and associated methods of use in marine geophysical surveys.

Embodiments of the rigid protracted geophysical equipment may comprise control surfaces that enable steering of the geophysical equipment. For example, the control surfaces may be configured to enable control of a particular geophysical instrument's depth and/or lateral positioning. By way of further example, the control surfaces may be configured to enable rotational control of the geophysical instrument. Moreover, the control surfaces may allow the rigid protracted geophysical equipment to perform a desired move while in the water, such as an undulation, surfacing, diving, rescue, or recovery. Examples of suitable control surfaces include, without limitation, wings, ailerons, and rudders, among others. Embodiments of the control surfaces may be mounted onto the geophysical equipment at deployment or may be retractable.

The control surfaces may be used with any of a variety of different rigid protracted geophysical equipment having a ratio of length to the largest dimension of width and height (diameter for a cylindrical-shaped instrument) of about 1000:1 or even more. For example, a rigid protracted geophysical instrument having a maximum width and height of about 100 millimeter may have a length of at least about 100 meters, having a maximum width and height of about 75 millimeters may have a length of at least about 75 meters, or having a maximum width and height of about 25 millimeters may have a length of at least about 25 meters. In some embodiments, the largest dimension of width and height the rigid protracted geophysical instrument may average about 25 millimeters or more. In some embodiments, the rigid protracted geophysical instrument may have a length in a range of from about 200 meters to about 2000 meters or longer, for example. In some embodiments, the rigid-geophysical instrument have length may have a length of up to about 16000 meters, which may be used, for example, with towing depths of a few to several hundred meters.

The rigid protracted geophysical equipment (when assembled and in operation) are characterized as being rigid in that they have a bending, torsion, and/or inline stiffness than can be maintained for considerable lengths, for example, up to about 10 meters, about 50 meters, about 100 meters, or even longer. Embodiments of the rigid protracted geophysical equipment may be characterized as being rigid for a length of about 25 meters or longer wherein the geophysical instrument has a smallest width or height of about 1 meter or less. The rigid protracted geophysical equipment may include any of a variety of different equipment that may be used in seismic, EM, or other types of marine surveying in which a sensor or other measuring device may be used to collect data while it is towed through a body of water. For example, the rigid protracted geophysical equipment may be used in a variety of different types of marine surveying that utilize towed sensors, such as acoustic, motion, EM, sonar, or other suitable sensors for marine surveying. In all these applications, the rigid protracted geophysical equipment may benefit from the use of the rigid-stem assembly instead of the towed-umbilical-on-winch concept that has been used previously. Examples of suitable rigid protracted geophysical equipment include, without limitation, sensor streamers, lead-ins, and towed geophysical sources. Sensors streamers may be elongated equipment used that include a plurality of geophysical sensors disposed thereon at spaced apart locations. Lead-ins may be elongated equipment used for towing geophysical instrument such as sensor streamers and geophysical sources from a survey vessel. Towed geophysical sources may be an instrument towed from a survey vessel that can be actuated to generate, for example, seismic or EM energy.

In some embodiments, the rigid protracted geophysical instrument may comprise a plurality of interconnected rigid stems. The rigid stems may be assembled on a survey vessel to form one or more long rigid-stem assemblies that can be deployed in the water. In alternative embodiments, the rigid protracted geophysical instrument may comprise a number of spacers that can be aligned in a rigid line to provide stiffness to the geophysical instrument. Components, such as electrical or optical conductors, geophysical sensors, and other electronics may be arranged in the geophysical equipment, for example, in the rigid stems. Control surfaces (such as wings, ailerons, rudders, etc.) may be included on the geophysical equipment for steering or control of rotation, for example. The rigid protracted geophysical instrument can have a round cross-section or have other shapes, such as wing-shaped cross-section for low drag or un-symmetric cross-section for optimization of properties or response. By way of example, the rigid-geophysical instrument may have an oval-, circular-, triangular-, square-, pentagonal-, other polygonal-, wing-, or non-symmetrical-shaped cross-section.

Unlike cables and structures that have been used previously as lead-ins and streamers, the rigid protracted geophysical equipment in the operational configuration will generally not form catenary, sinus hyperbolic, or parabolic curvatures over at least portions of the length, but will rather generally exhibit elastic behavior with deformation according to deformation of beams. Embodiments of the rigid protracted geophysical equipment when assembled cannot be stored and deployed from a drum, but rather may utilize a movable or fixed attachment point for deployment from a survey vessel. The attachment point may hold embodiments of the rigid protracted geophysical equipment by friction (e.g., wheel pairs) or a ring, for example. In alternative embodiments, the rigid protracted geophysical instrument may have a variable stiffness that can be activated after deployment in to the water. The variable stiffness instrument may have storable configuration in which the instrument is flexible and an operation configuration in which the instrument is rigid. For example, the rigid protracted geophysical instrument may have a storable configuration in which the instrument may be deployed and stored on a drum onboard a survey vessel, for example. After deployment into the water, for example, the streamer may be changed from the storable configuration to the operational configuration. The geophysical survey may then be conducted with the streamer in the operational configuration.

In some embodiments, the rigid protracted geophysical instrument (when assembled and in operation) may have a bending stiffness of 700 Newton-square meters ("$Nm^2$") or greater for considerable lengths (e.g., over about 25 meters or more). For example, the rigid protracted geophysical instrument may have a bending stiffness of 700 $Nm^2$ over substantially its entire length. The stiffness of 700 $Nm^2$ corresponds to a stiffness in a cantilever beam of 1-meter length fixed in one end with a load of 1 Newton in the other, deforming roughly 0.5 mm under the load. This corresponds to an aluminum (with Young's modulus of 70 GPa) tube with a 2-inch outer diameter and a thickness of 0.2 millimeters, a steel (with Young's modulus of 210 GPa) tube with a 2-inch outer diameter with a thickness of 0.03 millimeters or a circular rod with a Young's modulus of 2 GPa. Each of these items, i.e., the aluminum tube, the steel tube, and the circular rod, are examples of items with a bending stiffness of 700 $Nm^2$. A 2-inch outer diameter typically requires 5% deformation to be wound on a 2-meter drum, which is difficult for most materials. Most rigid materials can deform a maximum of 0.1% or, in extreme cases, 1% so they cannot be wound on a drum without being wound in a wire or umbilical. Lower strength materials may be able to deform but will then be soft to enable bending.

Embodiments of the rigid protracted geophysical instrument (when assembled and in operation) may have a stiffness that make them difficult to wind the instrument on or off a drum. The rigidity will generally create a bending arm for the tension under which it is taken in or out. This distance multiplied with the tension may create the load (known as the "critical load") which the rigid protracted geophysical instrument carries in the cross section of the first point of contact with the drum. The point of contact may be at or before the tangential point between the drum and the rigid protracted geophysical instrument, wherein the tangential point corresponds to no stiffness in the rigid protracted geophysical instrument and bending arm of zero. FIGS. 1 and 2 illustrate winding of a geophysical instrument 1 onto a drum 2. The bending arm is represented on FIG. 1 by arrow 3. The intake tension is represented by arrow 4. The torque is represented by arrow 6. As illustrated, the geophysical instrument 1 has a loaded cross-section 7 that is the first point of contact with the drum 2 and that carried the above-described critical load. While the geophysical instrument 1 shown on FIG. 1 may have some bending stiffness, it still can be wound onto the drum 2. In the embodiment shown on FIG. 2, the geophysical instrument 1 further contains a rigid body 8 that creates a bending restriction when wound onto the drum 2.

Equipment used previously in marine surveying typically has several contributors to the bending arm. For example, sensors streamers may have repeaters, connectors, sensor housings and the like that can add to the bending arm. In addition, bend restrictors may also be placed in the ends to protect the wires inside which can add to the bending arm. Lead-ins may also have several different contributors to increased bending arm, including reinforced umbilicals, solids such as gel filled, soft rigidified or the like, and true solids such as nylons, polyurethane, or compositions. For previous equipment used in marine surveying, the bending arm has been less than 0.3 m under a load of 3 kiloNewtons ("kN"). Some types will have almost the same bending arm for different loads (typically hinged joints and rigid bodies), other will deform much under increasing load and hence reduce bending arm (while load goes up), but all materials are limited in stiffness and have a certain deformation, even though the deformation can be very difficult to detect. Embodiments of the present technique may be used with a rigid protracted geophysical equipment (when assembly and in operation) more rigid than 700 $Nm^2$. This is more rigid than other cable or streamer-based equipment that have been used hereto for and, thus, the bending arm can become larger than 0.3 m. The rigid protracted geophysical equipment then may be in danger of damage or permanent deformation if subjected to 3 kN or more, hence winching may not a good handling method for certain embodiments.

FIG. 3 illustrates a marine geophysical survey system 5 in accordance with embodiments of the present invention. In the illustrated embodiment, the system 5 may include a survey vessel 10 that moves along the surface of a body of water 15, such as a lake or ocean. The survey vessel 10 may include equipment, shown generally at 20 and collectively referred to herein as a "recording system." By way of example, the recording system 20 may include one or more devices (none shown separately) for determining geodetic position of the survey vessel 10 (e.g., a global positioning system satellite receiver signal), detecting and making a time indexed record of signals generated by each of a plurality of geophysical sensors 25, and/or for actuating one or more energy sources 30 at selected times.

The survey vessel 10 or a different vessel (not shown) can tow a source cable 35 that includes one or more energy sources 30. As illustrated, the energy sources 30 may be towed above the water bottom 40, wherein the energy sources 30 are disconnected from the water bottom 40. In some embodiments (not shown), one or more of the energy sources 30 may be mounted to the hull of the survey vessel 10. The energy sources 30 may be any selectively actuable sources suitable for subsurface geophysical surveying, including without limitation seismic air guns, water guns, vibrators, EM transmitters, or arrays of such devices. As energy is emitted by the energy sources 30, it travels downwardly through the body of water 15 and rock formations 45 below the water bottom 40. It should be noted that, while the present example, shows only two energy source 30, the invention is applicable to any number of energy sources towed by survey vessel 10 or any other vessel.

The geophysical survey system 5 may include rigid protracted geophysical equipment, such as rigid sensor streamer 50 towed by the survey vessel 10 (or another vessel). As illustrated, the rigid sensor streamer 50 may include geophysical sensors 25 at spaced apart locations. In the illustrated embodiment, the rigid sensor streamer 50 may be formed, for example, by coupling a plurality of rigid-stem streamer assemblies 55 end-to-end. As illustrated, two rigid-stem streamer assemblies 55 may be coupled end-to-end, for example, at connection point/streamer stem joint 65. It is contemplated that more than two rigid-stem streamer assemblies 55 may be used in embodiments of the present invention. Each of the rigid-stem streamer assemblies 55 may comprise a plurality of interconnected rigid streamer stems 60. Streamer stem joints 65 may be disposed at the intersection of adjacent rigid streamer stems 60 for mechanically joining the adjacent rigid streamer stems 60 together. While not illustrated, a streamer stem joint 65 may not be used, in some embodiments, to couple at least one pair of adjacent rigid streamer stems 60 leaving an open joint. As previously mentioned, certain components (e.g., conductors, geophysical sensors 25, and other electronics) may be disposed in the rigid streamer stems 70. For example, sensors, such as motion sensors, may be disposed inside the rigid streamer stems 60 with the sensing water motion relative to the streamer 50 being the motion sensed by the rigid streamer stems 60. By way of further example, channels or other membranes (not shown) may be provided in the rigid streamer stems 60 for geophysical sensors, such as hydrophones, for containing the pressure signal from the body of water 15. A lead-in 70 may couple the streamer 50 to the survey vessel 10. In the illustrated embodiment, the lead-in 70 may comprise a cable.

While the present example, shows only one streamer 50, the invention is applicable to any number of laterally and/or vertically spaced apart streamers towed by survey vessel 10 or any other vessel. For example, in some embodiments, eight or more streamers may be towed by the survey vessel 10, while in other embodiments, up to twenty-six or more streamers may be towed by survey vessel 10. Advantageously, when towing multiple streamers (such as streamer 50 on FIG. 3) that contain the rigid-stem streamer assemblies 55, the streamers may be held at independent positions, both laterally and vertically (relative to the tow path). For example, one of the streamers may be held at or near the surface while the other streamers may be positioned deeper in the body of water 15. In some embodiments, the streamer 50 may be towed at a depth of up to about 25 meters. In alternative embodiments, the streamer 50 may be towed at a deeper depth than is typically employed in seismic surveys. For example, the streamer 50 may be towed at a depth of up to about 50 meters or more.

The geophysical sensors 25 may be any type of geophysical sensor known in the art. Non-limiting examples of such sensors may include seismic sensors such as geophones, hydrophones, or accelerometers, or EM field sensors, such as electrodes or magnetometers. Additional examples of sensors may include depth sensors, acoustical transponders, and transducers. In the illustrated embodiment, the geophysical sensors 25 are incorporated into the rigid streamer stems 60. By way of example, the geophysical sensors 25 may generate response signals, such as electrical or optical signals, in response to detecting energy emitted from the one or more energy sources 25 after the energy has interacted with the rock formations (not shown) below the water bottom. Signals generated by the geophysical sensors 25 may be communicated to the recording system 20.

While not shown on FIG. 3, additional sensors, actuators, transducers, and other electronics (e.g., tanks, batteries, etc.) may also be incorporated into the rigid streamer stems 60. Example sensors (e.g., geophysical sensor 25 on FIG. 1) that may be incorporated include sound/pressure sensors, motion sensors (speed, velocity, and/or acceleration), EM sensors, magnetism (e.g., compass), pressure sensors, depth sensors, tilt sensors, tension sensors, surface or bottom echosounders/ mappers, among others. In some embodiments, one or more actuators may be incorporated into the rigid streamer stems 60. Example actuators may include control surfaces, ballast tanks, openings, covers/lids, and connection points, among others. For example, control surfaces (such as wings, rudders, etc.) for steering or control rotational position may be used. As previously described, the control surfaces may act to provide depth and/or lateral control for the rigid streamer stems 60. Moreover, the control surfaces may allow the rigid streamer stems 60 to perform a desired move while in the water, such as an undulation, surfacing, diving, rescue, or recovery. Ballast tanks may be also be incorporated that can allow the rigid streamer stems 60 to maintain depth, surface, or compensate for water intrusion, such as by gassing a flooded chamber in the rigid streamer stem 60. Openings may also be provided for access to sensor surfaces, ballast, and/or weight/mass center manipulation. Connection points that are openable and/or closable may also be provided in the rigid streamer stems 60, such as valves or ports for feed or transmission lines. Covers/lids that are openable and/or closable may also be provided, which may enable cleaning and/or streamlined handling, for example.

Figure 4:
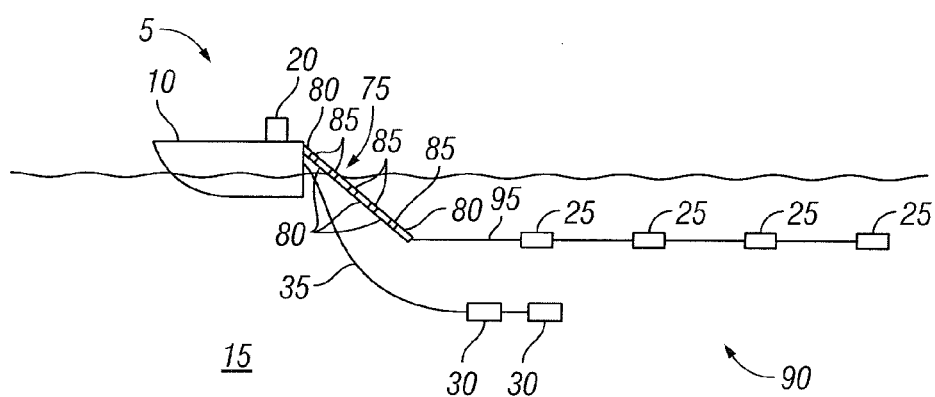

While FIG. 3 illustrates the use of rigid protracted geophysical equipment as a sensor streamer (e.g., rigid sensor streamer 50), embodiments may include the use of other rigid protracted geophysical equipment, such as lead-ins and towed geophysical sources, for example. FIG. 4 illustrates an alternative embodiment of the marine seismic survey system 5 that utilizes a rigid lead-in 75. In the illustrated embodiment, the rigid lead-in 75 comprises a plurality of interconnected lead-in rigid stems 80. As illustrated, the lead-in rigid stems 80 may be connected end-to-end, for example, by lead-in stem joints 85. The rigid lead-in 75 may be used, for example, to deploy the sensor streamer 90 from the survey vessel 10 and to maintain the sensor streamer 90 at a selected distance behind the survey vessel 10. In the illustrated embodiment, the streamer 90 comprises a cable 95 having geophysical sensors 25 disposed thereon at spaced apart locations.

FIG. 5 illustrates an alternative embodiment of the marine seismic survey system that comprises a rigid streamer 50 deployed behind survey vessel 10 using rigid lead-in 75. As illustrated, the rigid streamer 50 may be formed by coupling two rigid-stem streamer assemblies 55 end-to-end in accordance with embodiments of the present invention. In the illustrated embodiment, the rigid streamer 50 may be coupled to the survey vessel 10 by rigid lead-in 75, which may comprise interconnected lead-in rigid stems 80, as shown on FIG. 4. A flexible coupling element 100, for example, may couple the rigid lead-in 75 to the rigid streamer 50 so that the rigid streamer 50 may extend in a different direction in the body of water 15 than the rigid lead-in 75. In some embodiments, flexible coupling element 100 may provide passive or active control of the angle between rigid lead-in 75 and rigid streamer 50, and the active control may utilize remotely controlled actuators, as would be understood by one of ordinary skill in the art with the benefit of this disclosure.

Figure 6:
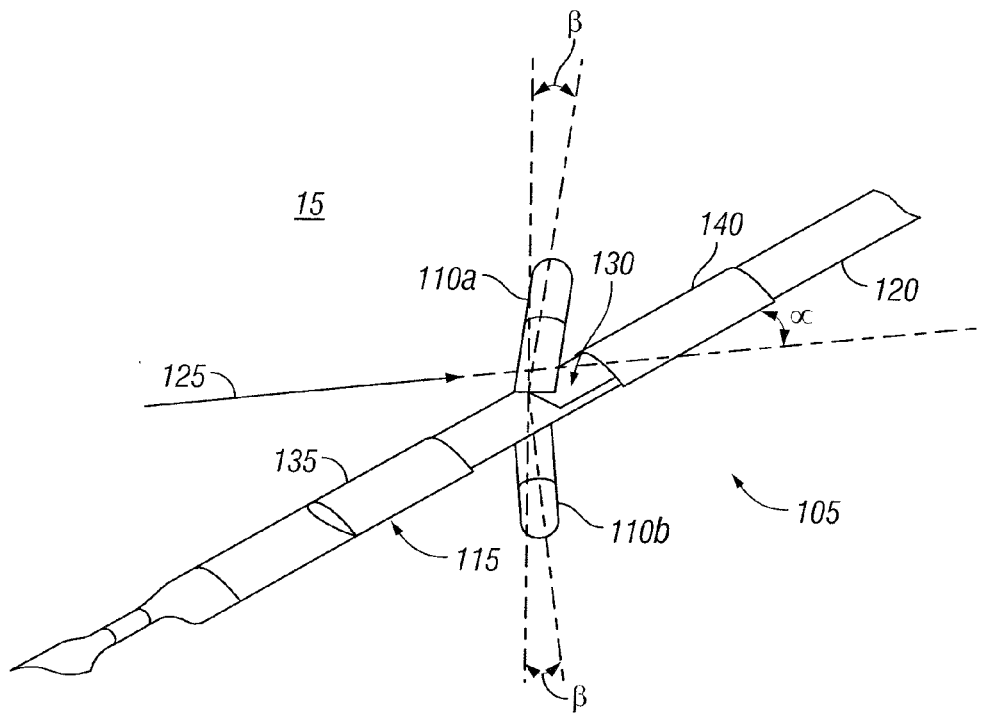
FIGS. 6 and 7 illustrate an example embodiment of rigid protracted geophysical equipment having wings.

As previously mentioned, embodiments of the rigid protracted geophysical equipment include control surfaces (such as wings, ailerons, rudders, etc.) for steering or control of rotation, for example. FIG. 6 illustrates rigid protracted geophysical equipment 105 that comprises wings 110*a*, 110*b*. As illustrated, the rigid protracted geophysical equipment 105 may comprise a rigid stem 115 that comprises stem body 120. The wings 110*a*, 110*b* may extend from the stem body 120, in accordance with embodiments of the present invention. As illustrated, the rigid protracted geophysical equipment 105 may be towed in or close to the horizontal plane, for example. The flow direction is illustrated on FIG. 6 by arrow 125. For embodiments when used as a lead-in, for example, the lateral angle α of the rigid stem 115 compared to the flow direction 125 may be small close to the path of the survey vessel 10 and larger for outer lead-ins with a lateral angle α of up to about 60° or greater, in some embodiments.

As illustrated, one of the wings 110*a*, 110*b* may extend upward (i.e., away from water bottom 40) from the stem body 120 and one of the wings 110*a*, 110*b* may extend downward (i.e., towards water bottom 40) from the stem body 120. In the illustrated embodiment, the wings 110*a*, 110*b* may be configured to provide lateral force, for example, to place the rigid streamer instrument 105 in a selected lateral position. In lead-in embodiments, the rigid streamer equipment 105 may be used to place the forward ends of the towed sensor streamer (e.g., sensor streamer 90 on FIG. 4) in a selected lateral position. In some embodiments, the wings 110*a*, 110*b* may be retractable. For example, the wings 110*a*, 110*b* may be foldable into the rigid protracted geophysical equipment 105. By being able to unfold the wings 110*a*, 110*b* into an open position, the rigid protracted geophysical equipment 105 may be lift-activated after deployment. In some embodiments, the wings 110*a*, 110*b* may be unfolded after deployment into the body of water 15 to move into the selected lateral position. In some embodiments, the stem body 120 may have a wing cavity 130 for receiving the wings 110*a*, 110*b*. In a closed configuration, the wings 110*a*, 110*b* may be folded and stored in the wing cavity 130. To open and close the wings 110*a*, 110*b* any of a variety of different suitable techniques may be used. In some embodiments, a wing-covering stem sleeve 135 may cover the wings 110*a*, 110*b* retaining them in the wing cavity 130. In alternative embodiments, the wings 110*a*, 110*b* may be opened using hinges or joints (not shown), which may be automated or driven manually, in combination with springs (not shown) or biasing the wings 110*a*, 110*b*.

The wing-covering stem sleeve 135 may be disposed over at least a portion of the stem body 120 and be slidably moveable on the stem body 120. For example, the wing-covering stem sleeve 135 may be configured to move on the stem body 120 and uncover the wings 110*a*, 110*b*. A thread screw or other suitable mechanism (not shown) may be used to drive the wing-covering stem sleeve 135. In some embodiments, the wings 110*a*, 110*b* may be biased, for example, by a spring (not shown) so that uncovering the wings 110*a*, 110*b* should cause the wings 110*a*, 110*b* to open. To close the wings 110*a*, 110*b*, the wing-covering stem sleeve 135 may be slid back over the wings 110*a*, 110*b* to cause the wings to fold back into the wing cavity 130. The rigid stem 115 may further comprise a wing-cavity stem sleeve 140 disposed over at least a portion of the stem body 120 and slidably moveable on the stem body 120. The wing-cavity stem sleeve 140 may be moved to cover the wing cavity 130, for example, to prevent drag caused by having an opening in the rigid stem 115. The wing-covering stem sleeve 135 and the wing-cavity stem sleeve 140 may have the same shape as the stem body 120, for example, to reduce drag on the rigid-stem assembly 220. By covering the swings 110*a*, 110*b* with a stem sleeve 135 having almost the same shape as the stem body 125 itself, the smoothness of the wing region may remain intact when the wings 110*a*, 110*b* in a closed position. In this manner, an almost identical diameter and surface texture may be preserved in the closed position while the wings 110*a*, 110*b* are hidden and protected in the wing cavity 130. Accordingly, when retracted into the wing cavity 130, the wings 110*a*, 110*b* may create no extra drag in contrast to conventional wings which can create significant drag even when not being used for the creation of hydrodynamic lift.

In alternative embodiments (not shown), the wings 110*a*, 110*b* may be mounted on the stem body 120 at deployment from the survey vessel 10 and removed from the stem body 120 at retrieval from the body of water 15. For example, the wings 110*a*, 110*b* may be mounted on the stem body 120 by way of a snap-on connection (not shown) or other suitable connection mechanism. However, wings 110*a*, 110*b* that are retractable may be beneficial in some embodiments, as they should not require manual interaction at deployment or retrieval from the survey vessel (e.g., survey vessel 10 on FIG. 3). In this manner, crew work load and hazardous operation may be reduced by use of wings 110*a*, 110*b* that are retractable. In addition, wings 110*a*, 110*b* that are retractable should not require *separate* storage space on the survey vessel.

The wings 110*a*, 110*b* may be mounted on the stem body 120 such that the wings 110*a*, 110*b* extend at an angle β from vertical with respect to flow direction 125. In this manner, the wings 110*a*, 110*b* may provide lateral lift as they are moved through the body of water 15. For example, the wings 110*a*, 110*b* may be at angle β of less about 90°, alternatively, less than about 45°, and alternatively, less than about 10°. As illustrated, the wings 110*a*, 110*b* may be considered to be vertical as they extend vertically or an angle β from vertical with respect to the flow direction 125. In some embodiments, the wings 110*a*, 110*b* may be fixed at the angle β. In alternative embodiments, the wings 110*a*, 110*b* may be coupled to the stem body 120 such that the wings 110*a*, 110*b* may be moved, for example, to any angle β. For example, the wings 110*a*, 110*b* may be mounted to the stem body 120 by an axle (e.g., axle 145 on FIG. 7) that can be actuated to move the wings 110*a*, 110*b* to the angle β. In some embodiments, one or more linear drives may be used to dive the wings 110*a*, 110*b* about of the wing cavity 130. In other embodiments, the wings 110*a*, 110*b* may be mounted on an axle that rotates freely or against one or more springs or stops. A freely rotating axle should achieve greater lateral-force-to-drag ratios and, thus, be more efficient in spreading the sensor streamers and/or lead-ins. In addition, a freely rotating axle may enable the same wings 110a, 110b to be used in different locations of the rigid protracted geophysical equipment 105, as they can be used in various angles β. The angle β can in other embodiments be actuated or driven by the opening/closing mechanism to change the angle β continuously or in steps to enable active steering of lift and, thereby, depth and offset of the entire towed assembly dynamically. For example, extension of the wings 110a, 110b may be controlled to vary the area of the wings 110a, 110b exposed as well as the angle β. In this manner, embodiments of the wings 110a, 110b may be controlled to provide optimal lift in contrast to conventional wings, for example, which always have the same area exposed. In some embodiments, a second actuator may be used to drive the wing angle. In some embodiments, separate actuators may be on both of the wings 110a, 110b in the same stem body 120.

While FIG. 3 illustrates only a single rigid stem 115 it should be understood that two or more rigid stems 115 each having wings 110a, 110b may be employed in the rigid protracted geophysical equipment 105 in accordance with embodiments of the present invention. To vary the lift generated by the wings 110a, 110b, the wings 110a, 110b on a subset of the rigid stems 115 may be opened. By leaving some or all of the wing 110a, 110b inside the rigid protracted geophysical equipment 105, the wings 110a, 110b on the inside may be protected, for example, from marine growth, which may be at least to some extend driven by exposure to sunlight. This may lead to a large reduction on the amount the wing mechanism and corresponding actuators have to move, thus potentially extending the useful life of the wings 110a, 100b. Moreover, by leaving some or all of the wings 110a, 110b inside the rigid protracted geophysical equipment 105, noise from the wings 110a, 110b themselves may be reduced. In some embodiments, some or all of the wings 110a, 110b may be closed to reduce noise in the recorded data.

In some embodiments, the wings 110a, 110b may be closed to reduce undesired interaction of the rigid protracted geophysical equipment 105 with objects in the body of water. For example, the rigid protracted geophysical equipment 105 may be become engaged with an undesired object, such as fishing gear, debris, or ropes that are in the body of water 15. To disengage the object, the wings 110a, 110b on successive rigid stems 115 may be closed until the object has become disengaged. In this manner, the wings 110a, 110b may be closed to reduce the risk of snagging such objects and the extra loads and steering may be avoided that could potentially result from such snagging.

When wings 110a, 110b are used in a rigid lead-in (e.g., rigid lead-in 75 on FIG. 4), depending on the proximity to the sensor streamer and the desired lateral position, different angles β may be selected for the wings 110a, 110b on each rigid lead-in. Accordingly, example embodiments may include different angles β used for the wings 110a, 110b on the same one of the rigid lead-ins while additional example embodiments may include different angles β for the rigid stems 115 on different rigid lead-ins. It should be understood that less wings 110a, 110b may be needed on the particular rigid lead-ins coupled to the innermost of the streamers as less lateral lift may be needed, for example.

Figure 7:
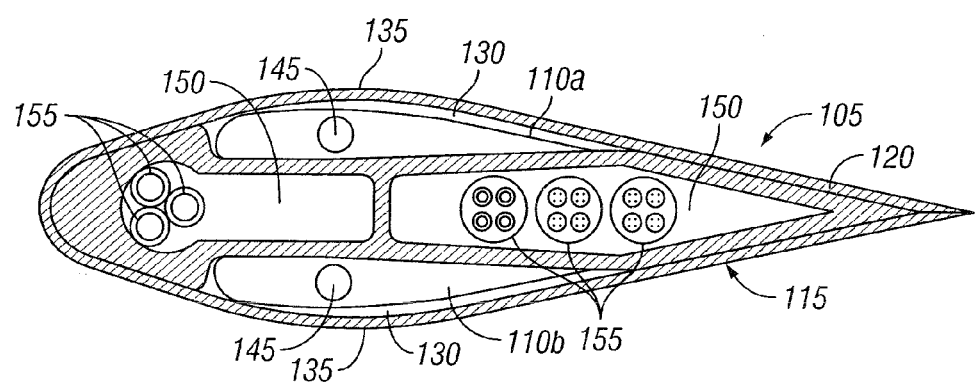

A cross-sectional view of a rigid protracted geophysical equipment 105 having wings 110a, 110b mounted to the stem body 120 is shown on FIG. 7 in accordance with embodiments of the present invention. In the illustrated embodiment, the rigid protracted geophysical equipment 105 has a flat or wing-shaped cross-section. The wings 110a, 110b are each shown folded in the corresponding wing cavity 130. As illustrated, the wings 110a, 110b may have a profile that is unsymmetrical. Wings 110a, 110b that are unsymmetrical may be used as the wings 110a, 110b do not have to work in both directions, in much the same manner as airplane wings. Unsymmetrical wings may have better performance in lift versus drag and, thus, less or smaller wings may be used with less noise. In some embodiments, the wing-covering sleeve 135 may be disposed over at least a portion of the stem body 120 and can cover the wings 110a, 110b, for example, to hold each of the wings 110a, 110b in the corresponding wing cavity 130. In the illustrated embodiment, the wings 110a, 110b are mounted to stem body 120 by axle 145. The axle 145 may be fixed or freely rotating, for example. The stem body 120 may also define one or more interior chambers 150 wherein various components may be installed, such as cables 155. While not shown, sensors, actuators, transducers, and other devices (e.g., tanks, batteries, etc.) may also be incorporated into the interior chambers 150.

The wings 110a, 110b may have a size suitable for a particular application. The size of the wings 110a, 110b may depend on a number of factors, including the lift needed, cavity size, aspect ratio, wingspan, or angle of attack. In some embodiments, the wings 110a, 110b may be longer than the larger of the width and height of the rigid protracted geophysical equipment 105. In other embodiments, the length of the wings 110a, 110b may be less than the larger of the width and height of the rigid protracted geophysical equipment 105. If the size of the wings 110a, 110b on the rigid protracted geophysical equipment 105 is reduced, more wings 110a, 110b may be required to provide equivalent lift.

Figure 8:
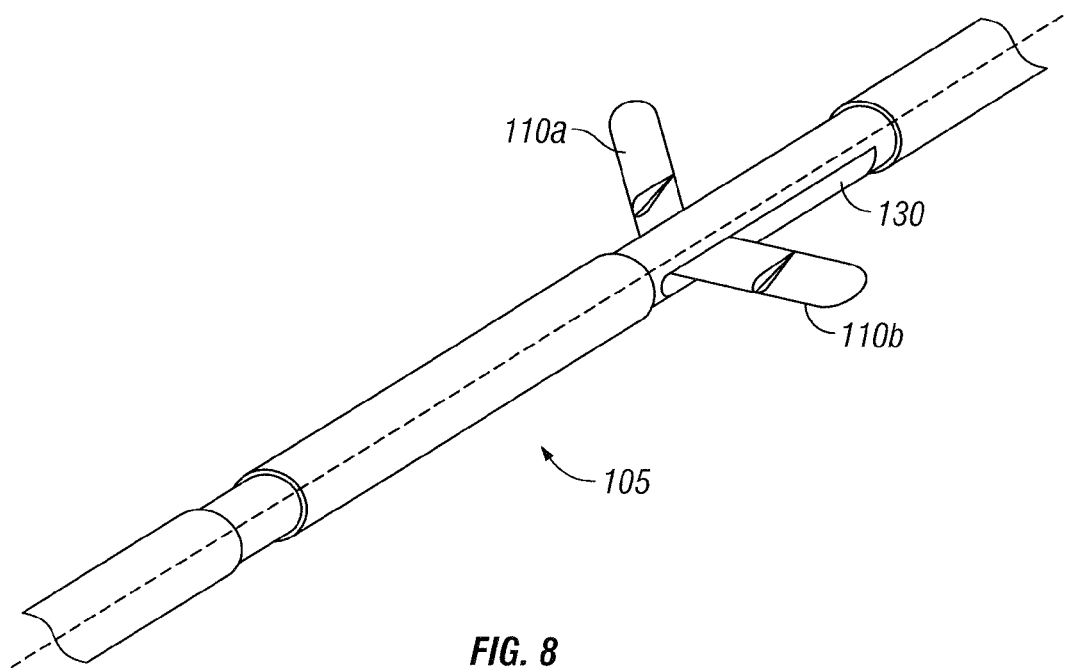
FIGS. 8 and 9 illustrate another example embodiment of a rigid protracted geophysical equipment having wings.
Figure 9:
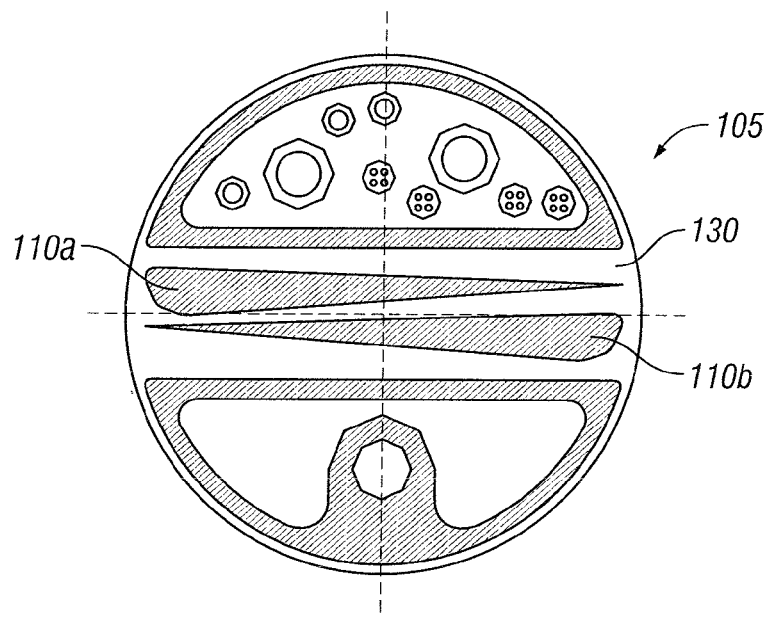

FIGS. 8 and 9 illustrate another embodiment of rigid protracted geophysical equipment 105 that comprises wings 110a, 110b. As illustrated, the rigid protracted geophysical equipment 105 may have a circular cross-section. FIG. 8 is a perspective view showing the wings 110a, 110b extending horizontally from the wing cavity 130 in the rigid protracted geophysical equipment 105. FIG. 9 is a cross-sectional view showing the wings 110a, 110b retracted into the wing cavity 130 in the rigid protracted geophysical equipment 105.

Figure 10:
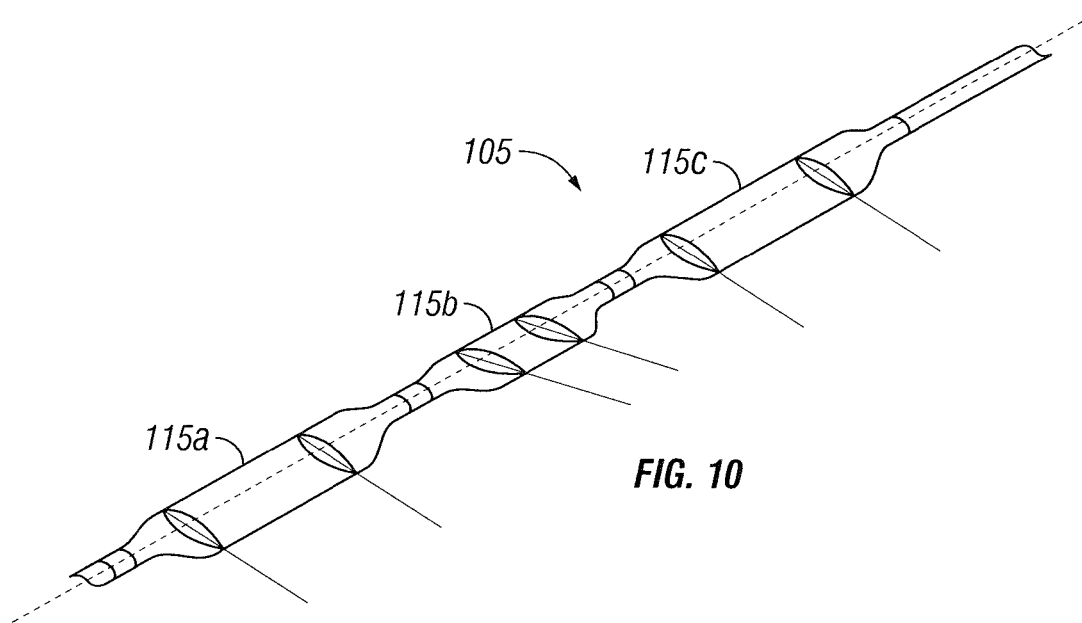
FIG. 10 illustrates an example embodiment using wings to control rotation of a segment of rigid protracted geophysical equipment.

FIG. 10 illustrates an embodiment showing a segment of rigid protracted geophysical equipment 105. In the illustrated embodiment, the rigid protracted geophysical equipment 105 is in the form of a rigid-stem assembly that comprise three rigid stems 115a, 115b, 115c. As illustrated, rigid stem 115b is disposed between the other two rigid stems 115a, 115c. In example embodiments, the rotation of the rigid stems 115b may be controlled using, for example, wings (e.g., wings 110a, 110b shown on FIGS. 6 and 7) so only rigid stem 115b is rotated to generate lift. In this manner, the middle rigid stem 115b may be at a different angle than the outer rigid stems 115a, 115c, whereby lift may be generated to force down the rigid protracted geophysical equipment 105. It should be understood that in the illustrated example connection the connection between the adjacent rigid stems may allow for relative rotation.

As previously mentioned, the wings 110a, 110b on the rigid protracted geophysical equipment 105 may have a number of different configurations. For example, the wings may extend generally vertically or generally horizontally from the rigid protracted geophysical equipment 105. The term "generally" as used herein with respect to the direction of wing extension mean that the wing extension may vary by as much as 20% from specified direction. FIGS. 11-13 illustrate cross-sectional view of the rigid protracted geophysical equipment 105 having different wing configurations. FIG. 11 illustrates an embodiment of the rigid protracted geophysical equipment 105 having a rigid stem 115 with a pair of wings 110a. 110b that extend generally vertically. Vertical extension of the wings 110a, 110b may be desired, for example, to provide lateral lift to the rigid protracted geophysical equipment 105. FIG. 12 illustrates an embodiment of the rigid protracted geophysical equipment 105 having a rigid stem 115 with a single wing 110a that extends generally horizontally from the rigid protracted geophysical equipment. Horizontal extension of the wing 110a may be desired, for example, to provide vertical lift to the rigid protracted geophysical equipment 105. Vertical lift may be used to steer the rigid protracted geophysical equipment 105 or particular segment thereof to a specified depth. FIG. 13 illustrates an embodiment of the rigid protracted geophysical equipment 105 having a rigid stem 115 with a pair of wings 110a, 110b that extend generally horizontally. While horizontal extension may be used to provide depth steering, horizontal extension of the wings 110a may also provide rotational steering.

In some embodiments, the direction of lift generated by the wings 110 may be controlled. For example, the angle of the wings 110 with respect to water flow may be adjusted to control the lift. This may make it possible for the wings 110 to generate upward or downward lift, for example, depending upon the particular angle. FIG. 14 is an end view of an embodiment that illustrates a wing 110 extending from a wing cavity 130. The wing 110 may be fixed to the stem body 115 at two points 160, which may be axles. The wing 100 may rotate at the points 160 to unfold, either by removal of a lid/cover or by mechanical actuation. The wing 110 may be configured to slide to different positions in the wing cavity 130. In some embodiments, the shape of the wing cavity 130 may be adjusted to allow control of the wing angle. FIGS. 15-17 illustrate embodiment in which the wing cavity 130 is in the form of an angled groove in the stem body 120. In some embodiments, the angled groove may be used in conjunction with a symmetric wing profile. By stopping the wing-covering stem sleeve 135 at different points on the stem body 120, the wing 110 may assume a different angle with respect to water flow. FIG. 15 illustrates the wing-covering stem sleeve 135 positioned with the wing 110 in a neutral configuration in accordance with embodiments of the present invention. FIG. 16 illustrates the wing-covering stem sleeve 135 positioned with the wing 110 in a configuration to provide downward lift in accordance with embodiments of the present invention. FIG. 17 illustrates the wing-covering stem sleeve 135 positioned with the wing 110 in a configuration to provide upward lift in accordance with embodiments of the present invention.

Figure 18:
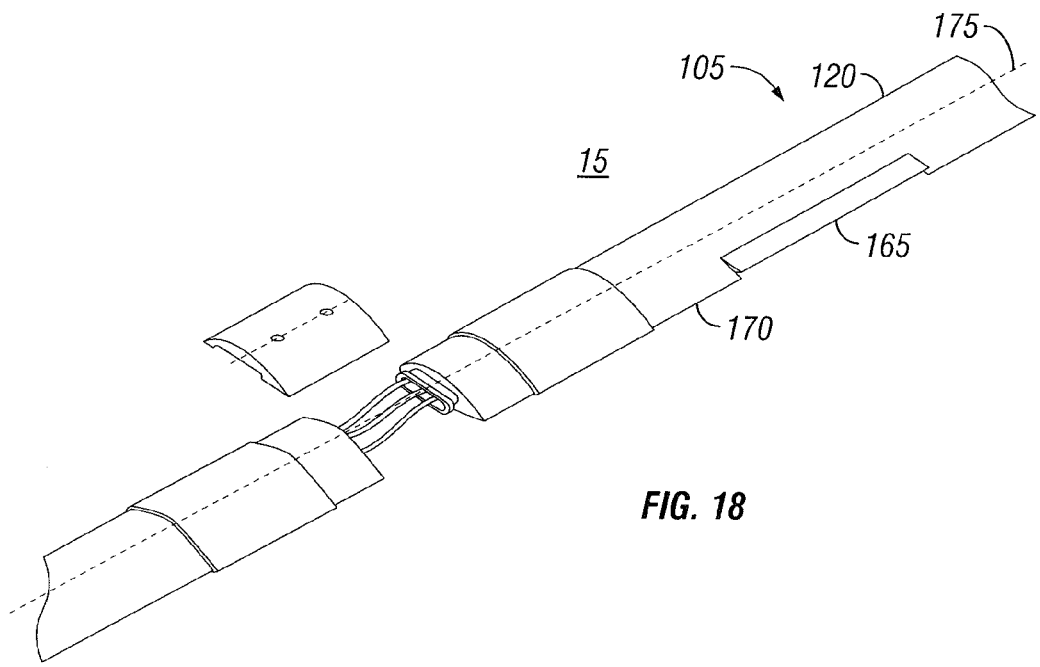
FIG. 18 illustrates an example embodiment of rigid protracted geophysical equipment comprising an aileron.

While the preceding figures illustrate the use of wings 110a, 110b with the rigid protracted geophysical equipment 105, embodiments of the present invention also encompass the rigid-geophysical equipment 105 with other control surfaces, such as ailerons and rudders, for example. FIG. 18 illustrates a rigid protracted geophysical equipment 105 comprising at least one aileron 165 attached to the edge 170 of the stem body 120 in accordance with some embodiments. As illustrated, the aileron 165 may extend longitudinally in a direction that is generally parallel to longitudinal axis 175 of the rigid protracted geophysical equipment 105. The aileron 165 may be moveable with respect to the rigid stem 120 to provide lift as the rigid protracted geophysical equipment 105 is moved through the body of water 15. In addition to providing vertical lift, the aileron 165 may also be configured to control rotation of a rigid protracted geophysical equipment 105 in which the rigid stem 120 may be incorporated. For example, the angle of the aileron 165 may be passively or actively adjusted to control rotation.

Figure 19:
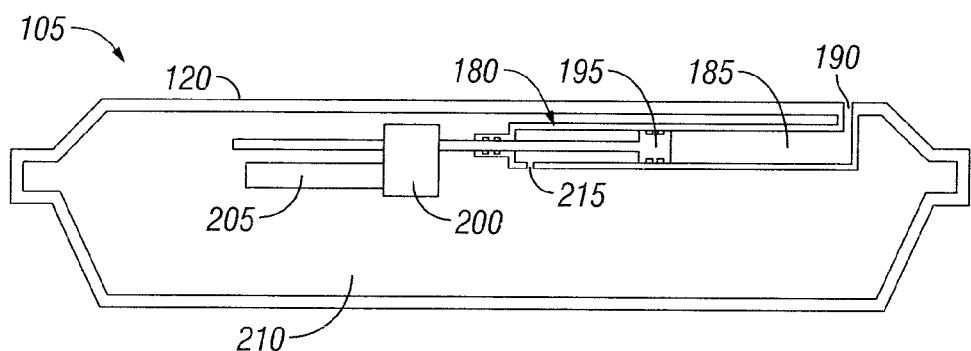
FIG. 19 illustrates an example embodiment of rigid protracted geophysical equipment comprising a ballast tank.

Example embodiments of the rigid protracted geophysical equipment 105 may comprise additional attachments or devices for depth control. For example, ballast tanks or other devices known to those of ordinary skill in the art may be used for depth control. FIG. 19 illustrates an embodiment of a rigid protracted geophysical equipment 105 comprising at least one ballast tank 180 disposed in the stem body 120. As illustrated, the ballast tank 180 has an interior volume 185 in fluid communication with first port 190. In some embodiments, a piston 195 may also be disposed in the ballast tank 180. The piston 195 may be operably coupled to a linear drive 200 and a motor 205. The linear drive 200 may operate, for example, to convert mechanical energy generated by the motor 205 to produce a straight line force such that the piston 195 can move longitudinally within the ballast tank 180. In some embodiments, the interior volume 185 of the ballast tank 180 may contain seawater. Water may be drawn into or expelled from the interior volume 185 for example, to control buoyancy or depth. At a desired time, the seawater may be expelled from the ballast tank 180 via the first port 190. To expel water from the ballast tank 180, the motor 205 may be used to move the piston 195, thus forcing water from the interior volume 185 through the first port 190. Air from interior chamber 210 of the stem body 120 should fill the interior volume 185 as the seawater is expelled. The piston 195 may be moved in an opposite direction, for example, to draw water into the interior volume 185. As illustrated, the interior volume 185 of the ballast tank 185 may be in fluid communication with the interior chamber 210 via second port 215. In other embodiments (not illustrated), other types of ballasting using, for example, elastic membranes or other methods of changing volume or mass of chambers by pumping or actuation, may be used as will be appreciated by those of ordinary skill in the art.

Figure 20:
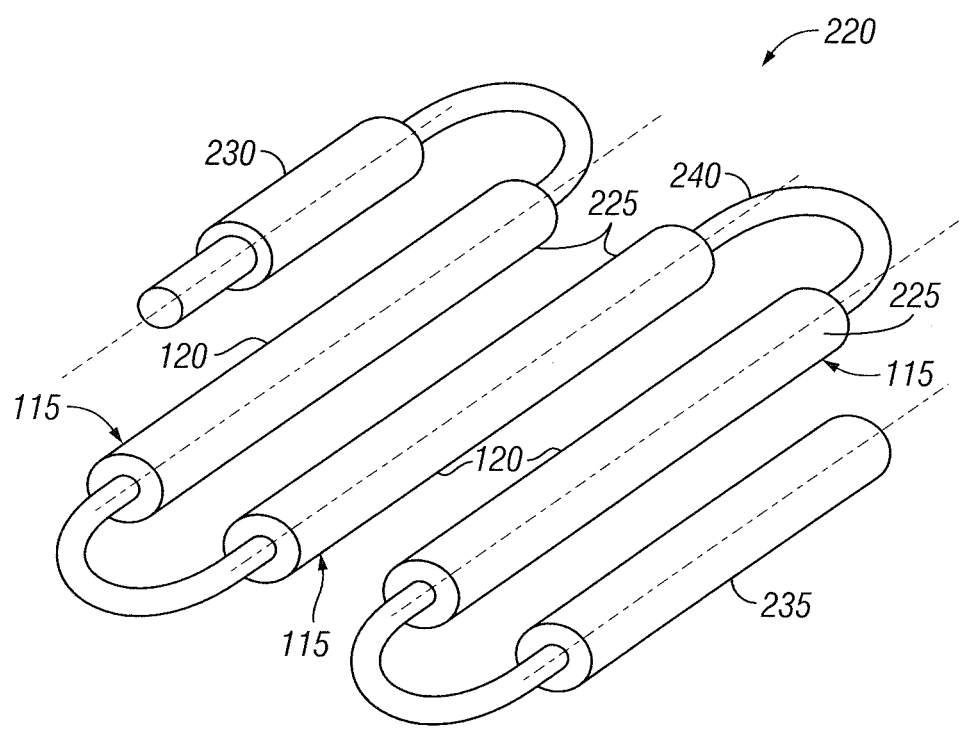
FIG. 20 illustrates a rigid-stem assembly having the flexible connection between rigid stems in an open position in accordance with example embodiments of the present invention.

Turning now to FIG. 20, a rigid-stem assembly 220 will be described in more detail in accordance with embodiments of the present invention. The rigid-stem assembly 220 shown on FIG. 20 may be used to form at least part of a device towed from a survey vessel (e.g., survey vessel 10 on FIGS. 3-5), including rigid sensor streamers (e.g., rigid sensor streamer 50 on FIGS. 3 and 5) and rigid lead-ins (e.g. rigid lead-in 75 on FIGS. 4 and 5) that are conventionally in the form of flexible cables. While not shown on FIG. 20, embodiments of the rigid-stem assembly 220 may comprise control surfaces (e.g., wings 110a, 110b on FIGS. 6-13 or aileron 165 on FIG. 18). The rigid-stem assembly 220 may be a structure for a number of items, including feed lines, gas lines, optical and/or electrical signals, power, external devices, geophysical sensors, tension sensors, and geophysical sources. The rigid-stem assembly 220 is shown in a de-coupled or open configuration. When open the rigid-stem assembly 220 may fold from at least 10° to 180° in one plane between adjacent rigid stems 115. In some embodiments, the rigid-stem assembly 220 may be stored on the survey vessel 10 in the de-coupled or open configuration and assembled prior to deployment into the body of water 15.

As illustrated, the rigid-stem assembly 220 may comprise a plurality of rigid stems 115. The rigid-stem assembly 220 (when assembled) is characterized as being rigid in that it has as bending, torsion, and/or inline stiffness than can be maintained for considerable lengths, for example, up to about 10 meters, about 50 meters, about 100 meters, or even longer. In some embodiments, the rigid-stem assembly 220 may have a bending stiffness of 700 Newton-square meters ("$Nm^2$") or greater for considerable lengths (e.g., over about 25 meters or more). For example, the rigid-stem assembly 220 may have a bending stiffness of 700 $Nm^2$ over substantially its entire length. Each of the rigid stems 115 may also have a bending stiffness of 700 $Nm^2$.

The rigid stems 115 may each comprise a stem body 120. A variety of different materials and composites may be suitable for use in the stem body 120. In some embodiments, the stem body 120 may be made from a material comprising aluminum, stainless steel, or titanium. In some embodiments, the stem body 120 may be made from a material comprising a composite, such as glass- or carbon-reinforced plastics, such as glass or carbon fibers in combination with epoxy or other resins (e.g., polyester, vinyl ester, nylon, etc.). In some embodiments, the glass fibers may include electric grade glass fibers, also referred to as "e-glass fibers." In alternative embodiments, suitable e-glass fibers may be boron-free. by weight In some embodiments, the stem body 120 may be made from a material comprising a plastic, such as polyethylene, polybutylene terephthalate, polysulphone, or another suitable thermoplastic polymer. Combinations of suitable materials may also be used. One of ordinary skill in the art, with the benefit of this disclosure, should be able to select an appropriate material for the stem body 120 based on a number of factors, including selection of an appropriate stiffness-to-weight while maintaining cost and bonding ability to available resins.

Figure 21:
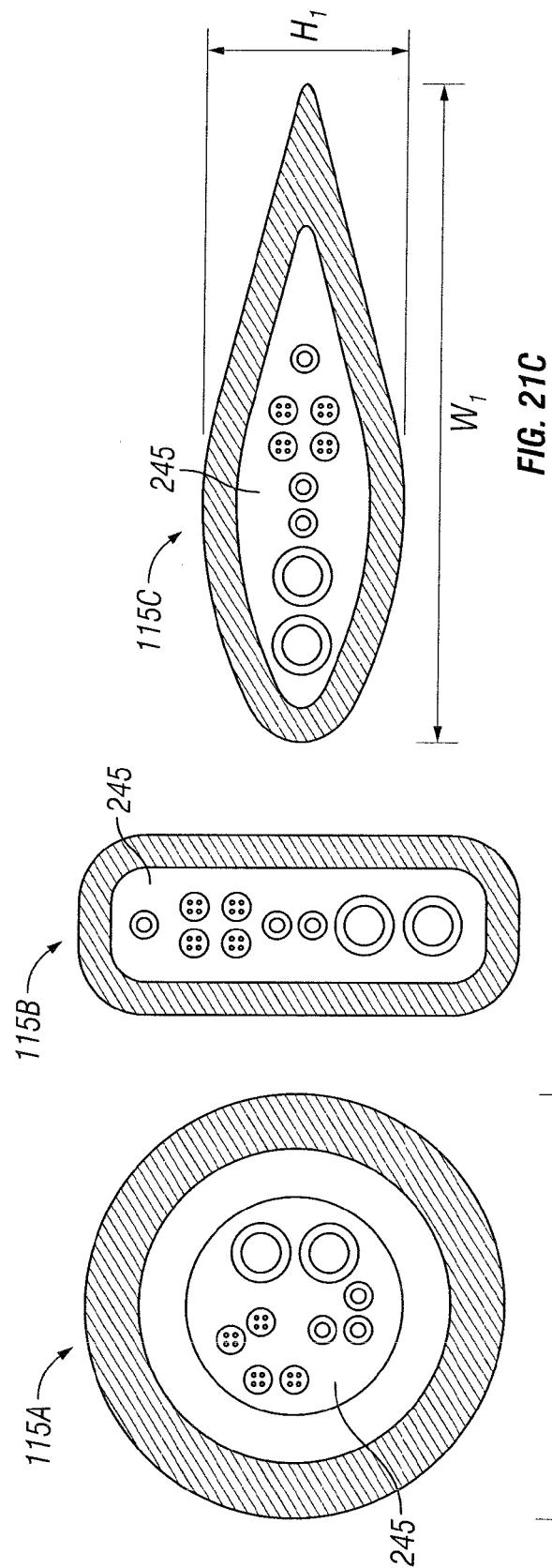
FIGS. 21A through 21C illustrate rigid-stems having different cross-sections in accordance with embodiments of the present invention.

It should be understood that the shape of the cross-section of the rigid stems 115 need not be circular, but may vary as desired for a particular application. The rigid stems 115 may have, for example, an oval-, circular-, triangular-, square-, pentagonal-, other polygonal-, wing-, or non-symmetrical-shaped cross-section. FIGS. 21A through 21C illustrate rigid stems 115 having differently shaped cross-sections. FIG. 21A illustrates a rigid stem 115A having a circular-shaped cross-section. FIG. 21B illustrates a rigid stem 115B having a rectangular-shaped cross-section. FIG. 21C illustrates a rigid stem 115C having a flat or wing-shaped cross-section. The wing-shaped cross-section may be desirable, for example, to reduce the drag coefficient for the rigid-stem assembly 220. A reduced drag coefficient may particularly beneficial for lead-ins (e.g., rigid lead-in 75 on FIGS. 4 and 5) where substantial cross-flow may be encountered. In some embodiments (not illustrated), the wing-shaped cross-section may have an asymmetric wing profile, which may be beneficial, for example, to provide one-side lift. The wing-shaped cross section may have ratio of width W1 to height H1 of greater than about and, alternatively, greater than about 1.5. In some embodiments, the wing-shaped cross section may have a ratio of width W1 to height H1 in a range of from about 1 to about 10. FIGS. 21A through 21C further illustrate the rigid stems 115 having an interior chamber 245, which may include various cables, such as electrical or optical cables, for example.

In some embodiments, the stem body 120 may be in the form of a pipe or other conduit that has a tubular portion that defines an interior chamber (e.g., interior chamber 245 shown on FIGS. 21A-21C). In some embodiments, a buoyant filler material may be used to fill the interior chamber. One example of a suitable buoyant filler material comprises air or other suitable gas. However, other buoyant filler materials may also be used to provide some degree of positive buoyancy for ballasting as well as electrical insulation, including foams, gelled hydrocarbon-based oil, hydrocarbon-based oil, viscoelastic polymer or other suitable electrically insulating, acoustically transparent materials, for example. In some embodiments, surface treatments may be applied to the exterior surface 225 of the stem body 120, for example, to reduce drag and antifouling. For example, one or more antifouling agents may be applied to the exterior surface 225. By way of further example, one or more drag-reduction treatments may be applied the exterior surface 225. While FIG. 10 illustrates the rigid protracted geophysical equipment 105 in the form of a rigid-stem assembly that comprises three rigid stems 115, it should be understood that embodiments of the rigid-stem assembly 220 may include more or less than three rigid stems 115, as desired for a particular application.

The rigid stems 115 may each have a length, for example, in a range of from about 1.5 meters to about 50 meters or, alternatively, from about 3 meters to about 12.5 meters. In specific embodiments, the rigid stems 115 may each have a length of about 3.125 meters, about 6.25 meters, about 12.5 meters, or about 25 meters. The rigid stems 115 may each have an outer diameter (e.g., $D_1$ on FIG. 21A) in a range of from about 0.02 meters to about 0.2 meters or, in alternative embodiments, of about 0.04 meters to about 0.08 meters, for embodiments with a circular-shaped cross-section, for example. The rigid stems 115 may each have a width ($W_1$ on FIG. 21C) in a range of from about 0.1 meters to about 0.5 meters and a height ($H_1$ on FIG. 21C) up to about 0.4 meters, for embodiments with a wing-shaped cross-section, for example. In some embodiments, the rigid stems 115 may an aspect ratio (ratio of width to height) of about 1 to about 20, about 2 to about 20, or about 1 to about 8. When assembled, the rigid-stem assembly 220 may have a length, for example, in a range of from about 50 meters to about 1000 meters. If more than one rigid-stem assembly 220 is joined end-to-end, the combined assembly may have a length in a range of from about 200 meters to about 2000 meters or longer, for example. In some embodiments, the combined assembly may have a length of up to about 16000 meters or more, which may be used, for example, with towing depths of a few to several hundred meters.

With continued reference to FIG. 20, embodiments of the rigid-stem assembly 220 may further comprise end connector elements, at either end of rigid-stem assembly 220. In the illustrated embodiment, the rigid-stem assembly 220 comprises as a male-type end connector element 230 at one end and a female-type end connector element 235 at the opposite end. The end connector elements should be configured for connection to corresponding connector elements (not shown) disposed at the longitudinal ends of adjacent rigid-stem lead-in assemblies. Each of the end connector elements can make mechanical and electrical connection to corresponding end connector elements on the other rigid-stem assembly (not shown).

As illustrated by FIG. 20, a flexible cable 240, which may be an electrical or optical conductor, for example, extends between the rigid stems 115. In some embodiments, the flexible cable 240 may conduct a gas, such as air, for maintenance of air volumes, ballasting, and recovery, as well as supply to air guns or other sources, which may be on the rigid-stem assembly 220, for example. The flexible cable 240 may extend from either end of the rigid-stem assembly 220 between the connector elements (e.g., from the male-type connector element 230 to the female-type connector element 235). The flexible cable 240 may extend through the interior chamber in the rigid stems 115. In some embodiments, the flexible cable 240 may comprise multiple cables extending through the passageway.

Figure 22:
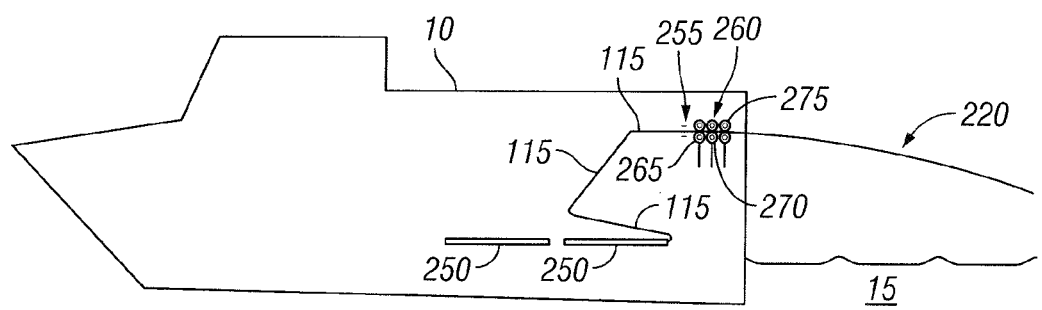
FIGS. 22 and 23 illustrate deployment of a rigid-stem assembly from a survey vessel wherein a de-tensioning apparatus holds the rigid-stem assembly in accordance with example embodiments of the present invention.
Figure 23:
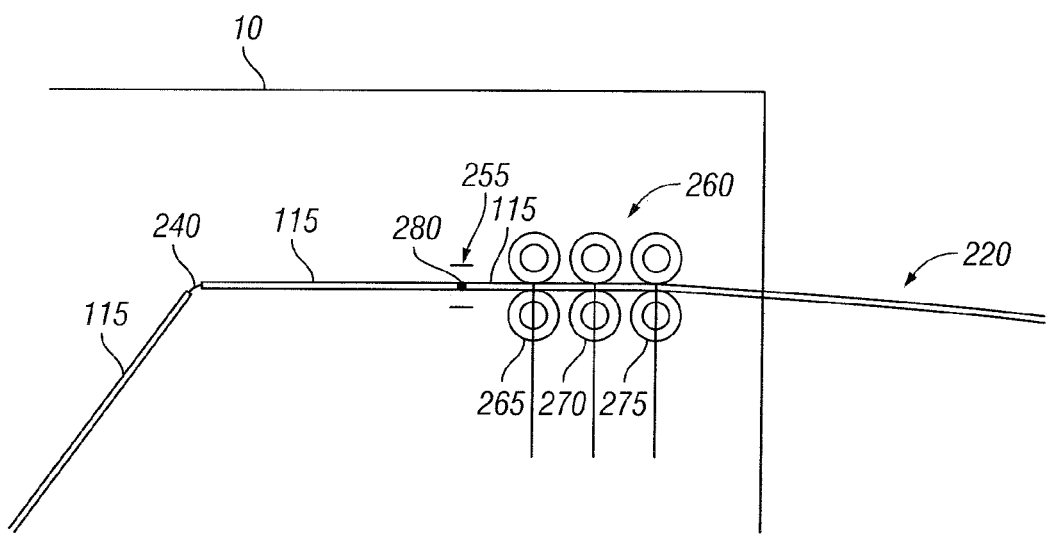

With reference now to FIGS. 22 and 23, deployment of a rigid-stem assembly 220 from a survey vessel 10 will now be described in accordance with embodiments of the present invention. For example, one or more rigid-stem assemblies 220 in accordance with embodiments of the present invention may be assembled and deployed from the survey vessel 10. The one or more rigid-stem assemblies 220 may be used to form at least part of a rigid protracted geophysical equipment towed from a survey vessel 10, including rigid sensor streamers (e.g., rigid sensor streamer 50 on FIGS. 3 and 5) and rigid lead-ins (e.g. rigid lead-in 75 on FIGS. 4 and 5) that are conventionally in the form of flexible cables. The stiffness of the rigid-stem assembly 220 may be activated at deployment and then de-activated upon retrieval.

In some embodiments, the rigid-stem assembly 220 may be removed from one or more storage bins 250. For example, one of the rigid stems 115 making up the rigid-stem assembly 220 may be lifted from the storage bins 250. In some embodiments, the rigid stems 115 making up the rigid-stem assembly 220 may be continuously removed from the storage bins 250 one after another. As illustrated by FIG. 22, the one or more storage bins 250 may be disposed on the survey vessel 10. The storage bins 250 may comprise, for example, pallets, receptacles, or other type of space for storing the rigid-stem assembly 220. In some embodiments, a rigid-stem assembly 220 comprising a plurality of de-coupled rigid stems 115 may be stored in each of the storage bins 250 on the survey vessel 10. In some embodiments, the rigid-stem assembly 220 in each of the storage bins 250 may comprise at least one flexible cable 240 extending between the connector elements (e.g., flexible cable 240 extending from the male-type connector element 230 to the female-type connector element 235 on FIG. 36). As shown by FIG. 20, example embodiments of the flexible cable 240 may turn approximately 180° between adjacent rigid stems 115 to minimize the space needed for storage.

In some embodiments, there may be a device (not shown) for removing the rigid-stems 115 from the storage bins 250. For example, the device may lift the rigid stems 115 from the storage bins 250. After being removed from the storage bins 250, the rigid-stem assembly 220 may be conveyed to the rigid-stem connection line 255 whose purpose is to couple the rigid stems 115 to adjacent rigid stems 115 using, for example, stem joints 280. In some embodiments, the stem joints 280 may be coupled between adjacent rigid stems 115, for example, by sliding a sleeve on the rigid stems 115 over into clamping engagement with the stem joints 280. The rigid-stem connection line 255 may be manual or at least partially automated, for example. In some embodiments, one or more individuals may manually couple the adjacent rigid stems 115 to each other. In alternative embodiments, a device may be used for coupling the adjacent rigid stems 115 to each other.

After coupling the adjacent rigid stems 115, the rigid-stem assembly 220 may be conveyed to the detensioning apparatus 260. The detensioning apparatus 260 holds the rigid-stem assembly 220 to remove tension on the rigid-stem assembly 220 caused by the portion of the rigid-stem assembly 220 deployed in the body of water 15. The detensioning apparatus 260 may be located proximate the rigid-stem connection line 255. As illustrated by FIGS. 22 and 23, the detensioning apparatus 260 may be disposed on the survey vessel 10. In some embodiments, the detensioning apparatus 260 pulls the rigid-stem assembly 220 from the storage bins 250 to the rigid-stem connection line 255. From the rigid-stem connection line 255, the detensioning apparatus 260 may deploy the rigid-stem assembly 220 into the body of water 15. As illustrated by FIG. 22, the rigid-stem assembly may bend down as it is deployed into the body of water 15. In alternative embodiments, the rigid-stem assembly 220 may bend up, for example, when the level of the body of water 15 is high or if the detensioning apparatus 260 is pivoting. The detensioning apparatus 260 may comprise one or more wheel pairs that engage the rigid-stem assembly 220. In the illustrated embodiment, the detensioning apparatus 260 comprises three wheel pairs 265, 270, 275. The detensioning apparatus 260 may apply tension to the rigid-stem assembly 220 by application of torque to the wheel pairs 265, 270, 275. In some embodiments, the detensioning apparatus 260 can apply more tension per wheel pair 265, 270, or 275, because the rigid-stem assembly 220 has a more rigid exterior surface than the previously used cables. It should be understood that other types of devices may be used for application of tension to the rigid-stem assembly 220. While not illustrated, the detensioning apparatus 260 may comprise, for example, clamps that engage shoulders on the rigid stems 115 or grooves or chamfers on the rigid stems 115; clamps in belts or in pistons or other linear machines that apply force to the rigid stems 115; a hook or other attachment device on a rope coupled to an attachment on the rigid stems 115, or pins that enter holes on the rigid stems 115 and which may be spring driven.

In some embodiments, more than one rigid-stem assembly 220 may be assembled and deployed from the survey vessel 10. To deploy multiple rigid-stem assemblies 220, the rigid-stem assemblies 220 should be coupled end-to-end. The end connector element at one end of a rigid-stem assembly 220 should be coupled to the corresponding end connector element of the other rigid-stem assembly 220. In some embodiments, each of the rigid-stem assemblies 220 may be stored in separated storage bins 250.

With continued reference to FIGS. 22 and 23, an example method for retrieving the rigid-stem assembly 220 onto the survey vessel 10 will now be described. In some embodiments, the detensioning apparatus 260 may pull the rigid-stem assembly 220 onto the survey vessel 15 to retrieve the rigid-stem assembly 220. The detensioning apparatus 260 may also hold the rigid-stem assembly 220 to remove tension from the rigid-stem assembly after the rigid-stem assembly 220 is back on board the survey vessel 10. After the detensioning apparatus 260, the rigid-stem assembly 220 may be conveyed to the rigid-stem connection line 255 for de-coupling adjacent rigid stems 115. For example, the rigid-stem connection line 255 may function to remove the stem joints 280 that interconnect the adjacent rigid stems 115, which de-coupling may be manual or at least partially automated. Once de-coupled, the rigid-stem assembly 220 can be placed into one of the storage bins 250. In some embodiments, the rigid-stem assembly 220 can be folded as it is placed into the storage bins 250. FIGS. 22 and 23 illustrate vertical folding of the rigid-stem assembly 220. The folding may be performed under the back deck, in front of the back deck, or where space on the survey vessel 10 is most reasonably available. In alternative embodiments, the folding may be formed sideways, for example, in a shallow troth, which could exploit a wide back deck without requiring space outside. It should be understood that if multiple rigid-stem assemblies 220 have been deployed, the rigid-stem assemblies 220 may need to be disconnected, for example, to store each rigid-stem assembly 220 in a separate one of the storage bins 250.

Figure 24:
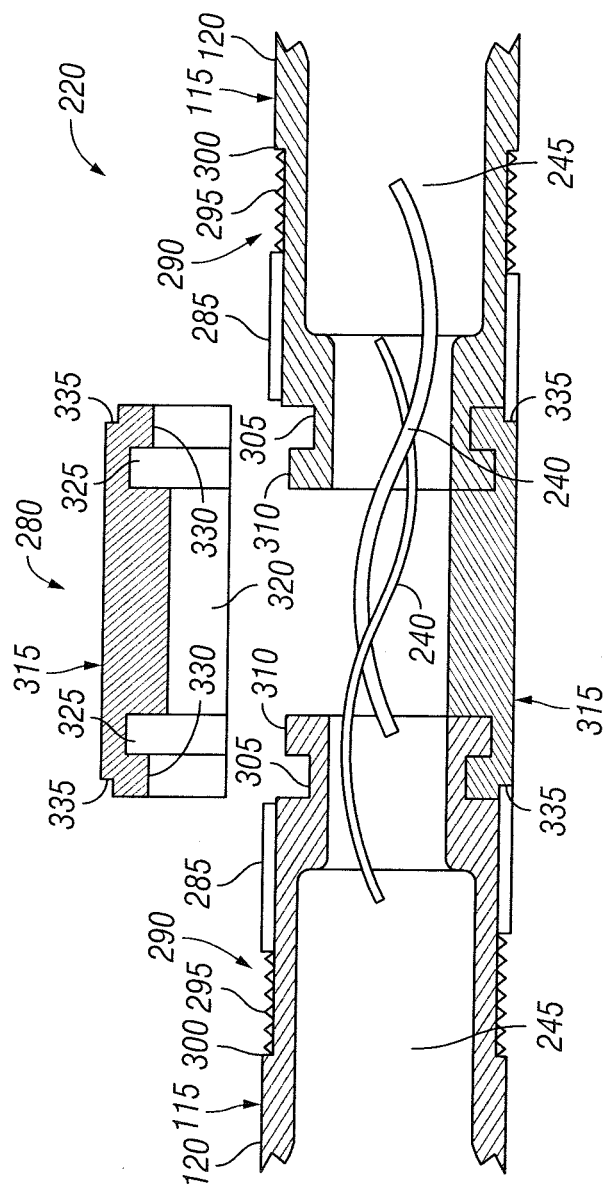
FIG. 24 illustrates use of a stem joint to close the flexible connection between adjacent rigid stems in accordance with example embodiments of the present invention.

A wide variety of different techniques may be used in accordance with embodiments of the present invention for coupling adjacent rigid stems 115. FIG. 24 illustrates a section of a rigid-stem assembly 220 that uses of a stem joint 280 clamped between the adjacent rigid stems 115 to close the flexible connection by forming a rigid connection between the adjacent rigid stems 115 in accordance with example embodiments of the present invention. As illustrated, two adjacent rigid stems 115 may be coupled together by a stem joint 280 in accordance with embodiments of the present invention. To maintain rigidity of the rigid-stem assembly 220 (e.g., shown on FIG. 20), the stem joint 280 may form a rigid connection between the adjacent rigid stems 115. As illustrated, the rigid stems 115 may each have an interior chamber 245 with flexible cables 240 extending between the rigid stems 115 running through the rigid stems 115 by way of the interior chamber 245. In accordance with present embodiments, sleeves 285 may be used for holding the stem joint 280 in clamping position to couple the rigid stems 115. The ends portions 290 of each of the rigid stems 115 may comprise a sleeve 285. The sleeves 285 may be slidably moveable on the end portions 290. The sleeves 285 may each be spring loaded by a corresponding spring 295. The outer surface of each of the rigid stems 115 may comprise a shoulder 300 for receiving the corresponding spring 295. The end portions 290 of each of the rigid stems 115 may further comprise a notch 305 that defines a shoulder 310.

The stem joint 280 may comprise two clamp portions 315. The clamp portions 315 should cooperate with one another so that, when the stem joint 280 is assembled, the clamp portions 315 define a rigid-stem passage that receives at least a portion of the end portions 290 of the rigid stems 115. In some embodiments, each of the clamp portions 315 may have a C-shaped cross-section. It should be understood that the cross-section of the clamp portions 315 may vary, for example, based on the particular configuration of the rigid stems 115. The clamp portions 315 may each have an interior surface 320, best seen for the top clamp portion 315. The interior surfaces 320 may each have recesses 325 at either end therein that engage the corresponding shoulders 310 of the end portions 290 when the stem joint 280 is assembled. The recesses 325 may each extend around the interior surface 320 at either end of the corresponding clamp portion 315. A clamping shoulder 330 may be defined by each of the recesses 325. The clamping shoulders 330 may engage the corresponding notches 305 in the end portions 290 when the stem joint 280 is assembled. Each end of the clamp portions 315 may further comprise an exterior shoulder 335 for receiving the corresponding sleeve 285. Each of the sleeves 285 slides into the corresponding exterior shoulders 335 to fasten the clamp portions 315 in clamping position to couple the rigid stems 115, as shown by the one of the clamp portions 315 in the lower portion of FIG. 24.

Embodiments of the present invention are not limited to the stem joint 280 illustrated by FIG. 24. It should be understood that other types of connectors may be used to couple the rigid stems 115 to one another. Examples of connectors that may be used for the stem joint 280 include, without limitation, a locking nut with inline pin, socket connections, face, and mating plane orthogonal to main axis.

Figure 25:
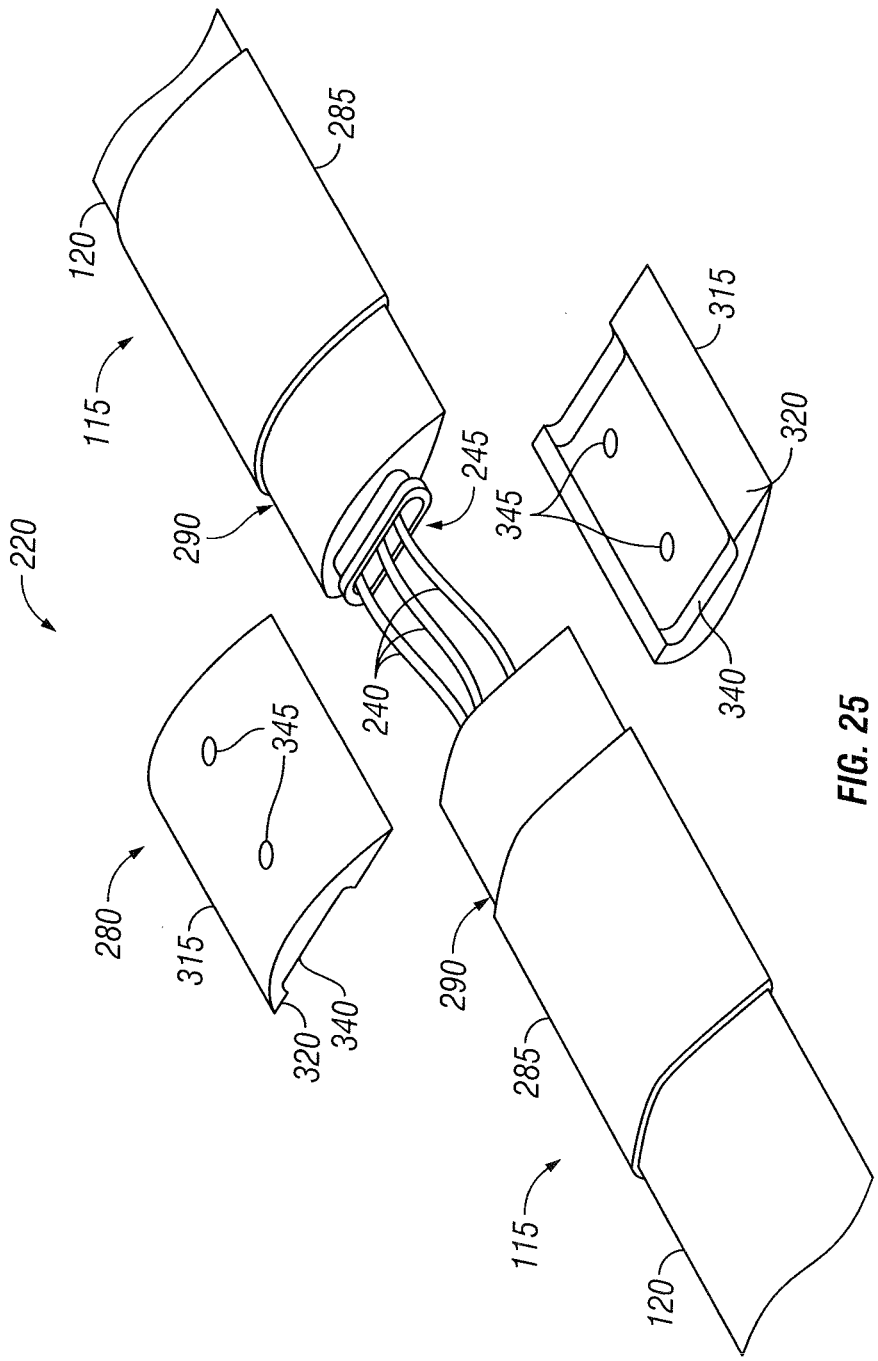
FIG. 25 illustrates another example embodiment using a stem joint us to close the flexible connection between adjacent rigid stems.

FIG. 25 illustrates an alternative embodiment for closing the flexible connection between the adjacent rigid stems. As illustrated, the adjacent rigid stems may be coupled together by a stem joint 280 in accordance with embodiments of the present invention. To maintain rigidity of the rigid-stem assembly 220, the stem joint 280 may form a rigid connection between the adjacent rigid stems 115. As illustrated, the adjacent rigid stems 115 may each comprise a stem body 120 having an interior chamber 245 with flexible cables 240 extending between the adjacent rigid stems 115 by way of the interior chamber 245. In accordance with present embodiments, sleeves 285 may be used for holding the stem joint 280 in clamping position to couple the adjacent rigid stems 115. The stem body 120 of each of the adjacent rigid stems 115 may have a longitudinal end portion 290 over which the sleeves 285 may be disposed. The sleeves 285 may each be slidably moveable on the corresponding longitudinal end portion 290 to cover the stem joint 280 and hold it in place. While not illustrated, a locking element may be provided for securing the sleeves 285 in locking position. For example, the sleeves 285 may each be spring loaded by a corresponding spring.

The stem joint 280 may comprise two clamp portions 315. The clamp portions 315 should cooperate with one another so that, when the stem joint 280 is assembled, the clamp portions 315 define a rigid-stem passage that receives at least a portion of the longitudinal end portion 290 of each of the adjacent rigid stems 115. In some embodiments, each of the clamp portions 315 may generally have a bent- or C-shaped cross-section. It should be understood that the cross-section of the clamp portions 315 may vary, for example, based on the particular configuration of the adjacent rigid stems 115. The clamp portions 315 may each have an interior surface 320. The interior surfaces 320 may each have axially extending recesses 340 for receiving the end portions 290 of the adjacent rigid stems 115. As illustrated, the clamp portions 315 may have holes 345 for receiving bolts (not shown) to hold the clamp portions 315 in place. In some embodiments, the sleeves 285 may also slide over the ends of the clamp portions 315 to fasten the clamp portions 315 in clamping position to couple the adjacent rigid stems 115. In other embodiments (not illustrated), the clamp portions 315 might go over not only the flexible cables 240, but also hinges or some other mechanism that could connect the rigid stems 115 while keeping one axis of the flexibility open for folding the stems to be closed by the clamp portions 315.

Figure 26:
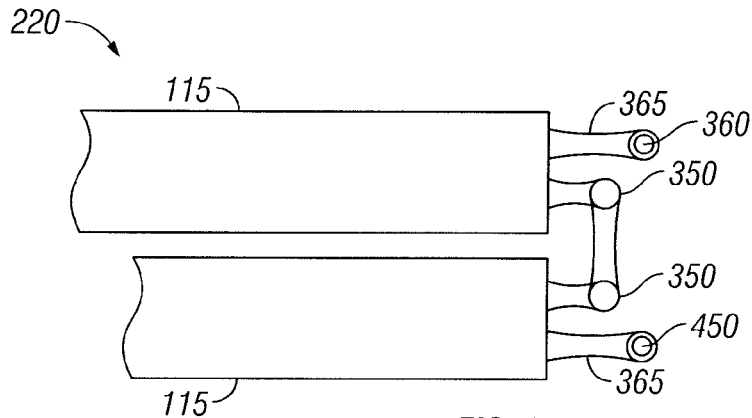
FIGS. 26 and 27 illustrate use of a locking pin to close the flexible connection between adjacent rigid stems in accordance with example embodiments of the present invention.
Figure 27:
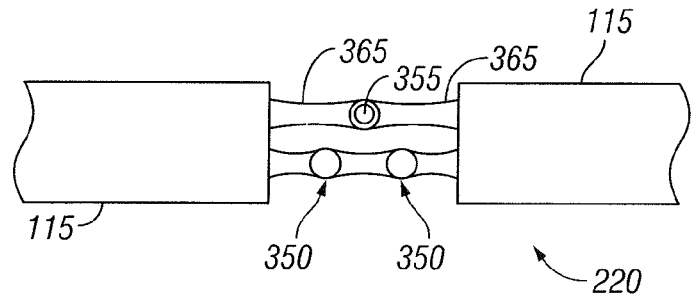

FIGS. 24 and 25 illustrate an alternative embodiment for closing the flexible connection between the adjacent rigid stems 115. In the illustrated embodiment, a section of a rigid-stem assembly 220 is shown that comprises two adjacent rigid stems 115. As illustrated by FIG. 26, the adjacent rigid stems 115 may be held together by two hinges 350 in the open position. The hinges 350 may generally form a flexible connection between the adjacent rigid stems 115. In general, the hinges 350 may allow for folding up to 180 degrees in one plane so that the rigid-stem assembly 220 may be stored on the survey vessel 10 when not in use. Other designs for the hinges 350 may be used in accordance with embodiments of the present invention. While not shown, electrical or optical conductors may also extend between the adjacent rigid stems 115. FIG. 27 illustrates the flexible connection between the rigid stems 115 in a closed position. In the illustrated embodiment, a locking pin 355 may be used to secure the flexible connection between the rigid stems 115, rigidifying the connection there between. As shown, each of the rigid stems 115 may have an arm 365 extending longitudinally there from. Openings 360 at the end of each arm 365 may be aligned with the locking pin 355 disposed through the aligned openings 360 to close the flexible connection. While FIGS. 26 and 27 illustrate use of hinges 350 to form the flexible connection, other suitable techniques such as the flexible cable 240 (e.g., FIG. 20) may be used to form the flexible connection with the locking pin 440 used to close the flexible connection.

Figure 28:
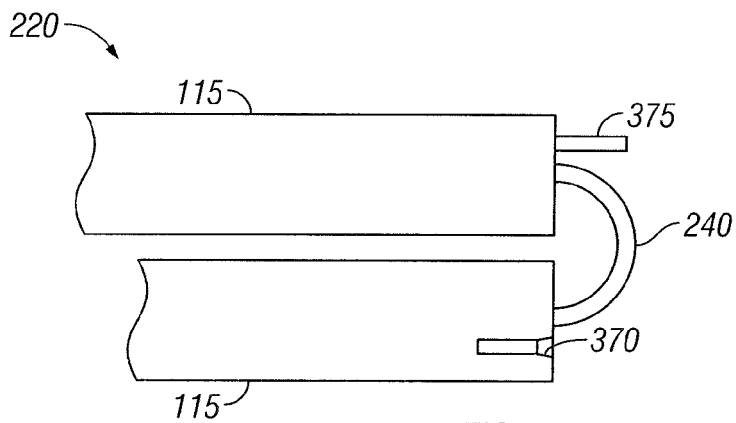
FIGS. 28 and 29 illustrate use of an extendible rod to close the flexible connection between adjacent rigid stems in accordance with example embodiments of the present invention.
Figure 29:
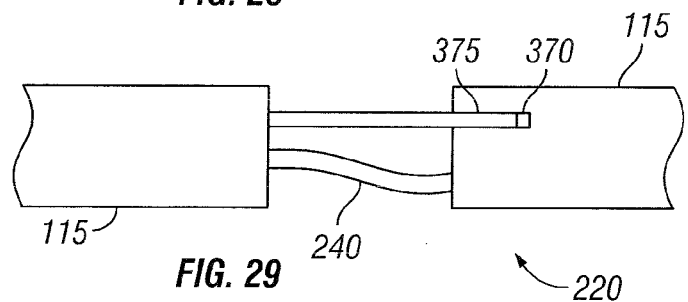

FIGS. 28 and 29 illustrate another alternative embodiment for closing the flexible connection between the adjacent rigid stems 115. In the illustrated embodiment, a section of a rigid-stem assembly 220 is shown that comprises two adjacent rigid stems 115. As illustrated by FIG. 28, the adjacent rigid stems 115 may be held together by a flexible cable 240 in the open position. The flexible cable 240 may generally form a flexible connection between the adjacent rigid stems 115, for example, to allow folding of the rigid-stem assembly 220 for storage when not in use. FIG. 29 illustrates the flexible connection between the rigid stems 115 in a closed position. In the illustrated embodiment, one of the rigid stems 115 includes a socket 370 while the other one of the rigid stems 115 includes an extendable member, such as extendable rod 375. The extendible rod 375 may be configured to extend into the socket 370 to close the flexible connection rigidifying the connection between the adjacent rigid stems 115. The bending stiffness of the extendable rod 375 may be used to rigidify the connection and prevent bending. While FIGS. 28 and 29 illustrate use of the flexible cable 240 to form the flexible connection, other suitable techniques such as the hinges 350 (e.g., FIG. 26) may be used to form the flexible connection with the extendable rod 375 and socket 370 used to close the flexible connection.

Figure 30:
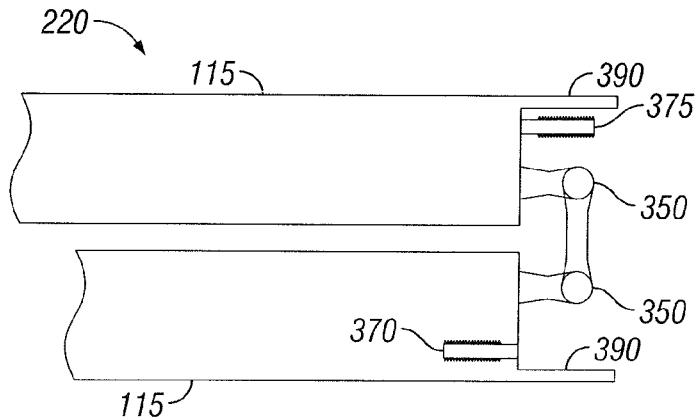
FIGS. 30 and 31 illustrate use of an extendible rod with a stopper hinge to close the flexible connection between adjacent rigid stems in accordance with example embodiments of the present invention.
Figure 31:
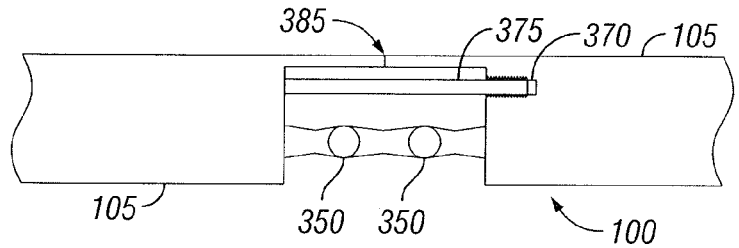

FIGS. 30 and 31 illustrate another alternative embodiment for closing the flexible connection between the adjacent rigid stems 115. In the illustrated embodiment, a section of a rigid-stem assembly 220 is shown that comprises two adjacent rigid stems 115. As illustrated by FIG. 30, the adjacent rigid stems 115 may be held together by hinges 350 in the open position. The hinges 350 may generally form a flexible connection between the adjacent rigid stems 115, for example, to allow folding of the rigid-stem assembly 220 for storage when not in use. FIG. 31 illustrates the flexible connection between the rigid stems 115 in a closed position. In the illustrated embodiment, one of the rigid stems 115 includes a socket 370, which may be threaded, for example. The opposing one of the rigid stems 115 may include an extendable member, such as threaded rod 375. The threaded rod 375 may be rotated into threaded engagement with the socket 370 to close the flexible connection and thus rigid the connection to prevent bending. FIGS. 30 and 31 also show a stopper 385 formed by intersection of extensions 390 from each rigid stem 115, to further enable a rigid connection, for example, when the threaded rod 375 may be in tension only. While FIGS. 30 and 31 illustrate use of the hinges 350 to form the flexible connection, other suitable techniques such as the flexible cable 240 (e.g., FIG. 20 or FIG. 28) may be used to form the flexible connection with the threaded rod 375 and socket 370 used to close the flexible connection.

Figure 32:
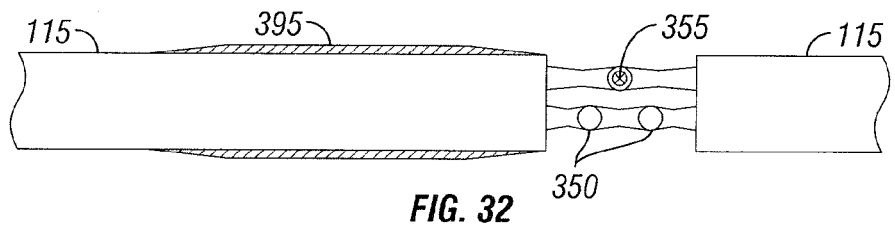
FIGS. 32 and 33 illustrate use of a protective cover over the flexible connection in accordance with example embodiments of the present invention.
Figure 33:
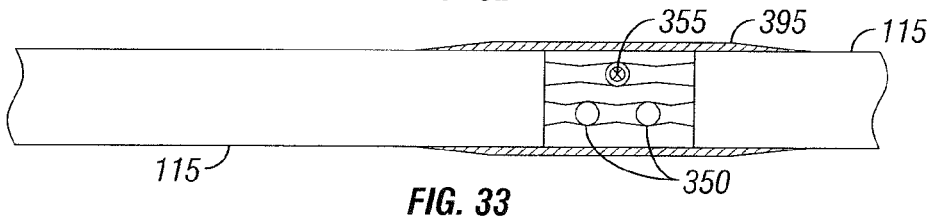

FIGS. 32 and 33 illustrate an example embodiment that includes a protective cover 395. As illustrated, the protective cover 395 may be applied between the adjacent rigid stems 115 to protect the flexible connection, such as electrical conductors, optical conductors, and other cables, parts, and supply lines that may line therein. The protective cover 395 may extend over the flexible connection in the closed position, best seen in FIG. 33. In some embodiments, the protective cover 395 may be positioned on one of the rigid stems 115 (FIG. 30) and slid over the flexible connection for protection (FIG. 31). The protective cover 395 may lock with engaging threads (not shown) directly on the rigid stems 115, fit on one or more cylindrical surfaces (not shown) on each side of the rigid stems 115, or mate in other ways that will be apparent to those of ordinary skill in the art, with the benefit of this disclosure. The protective cover 395 may be placed over the flexible connection manually or with a machine. In other embodiments, the protective cover 395 may be held together with lock pins, nuts, or another suitable connection mechanism. While FIGS. 32 and 33 illustrate use of the hinges 350 to form the flexible connection and locking pin 335 to close the flexible connection, other suitable techniques such as those described herein may be used in accordance with embodiments of the present invention.

Figure 34:
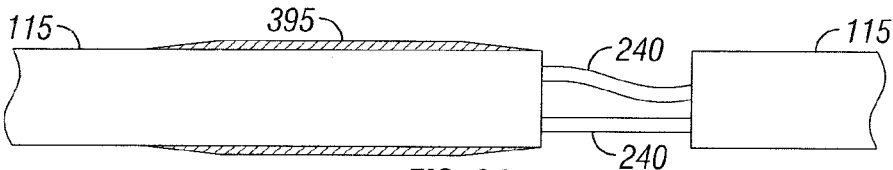
FIGS. 34 and 35 illustrate use of a protective cover to close the flexible connection in accordance with example embodiments of the present invention.
Figure 35:
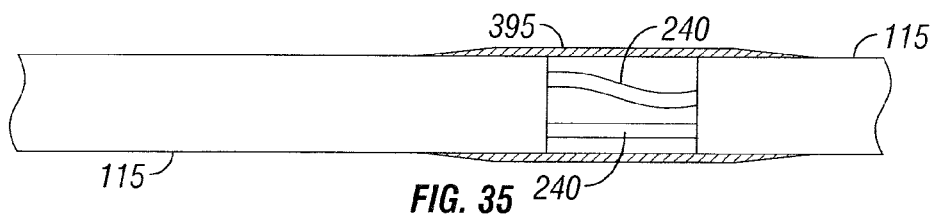

As illustrated by FIGS. 34 and 35, the protective cover 395 may also be used in some embodiments to close the flexible connection, thus rigidifying the connection to prevent bending. A flexible cable 240 may be used to hold the adjacent rigid stems 115 together in the open position, as best seen in FIG. 34. To close the flexible connection, the protective cover 395 may be applied between the adjacent rigid stems 115. While FIGS. 34 and 35 illustrate use of the flexible cable 240 to form the flexible connection, other suitable techniques such as the hinges 350 (e.g., FIG. 26, 30, or 32) may be used to form the flexible connection with the protective cover 395 used to close the flexible connection.

Figure 36:
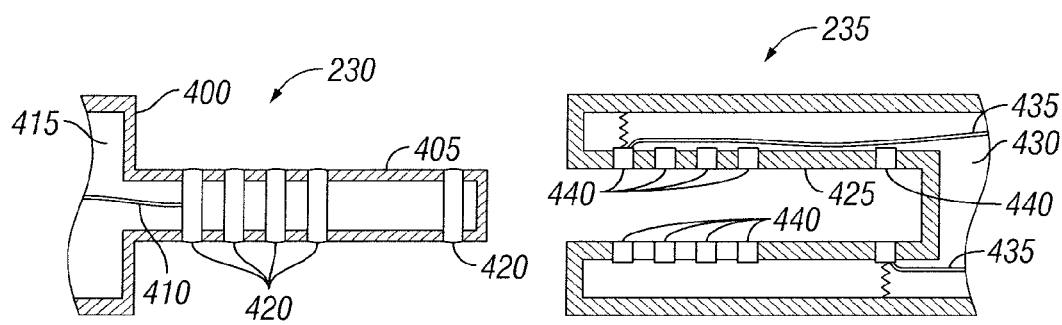
FIGS. 36 and 37 illustrate coupling of two rigid-stem assemblies in accordance with embodiments of the present invention.
Figure 37:
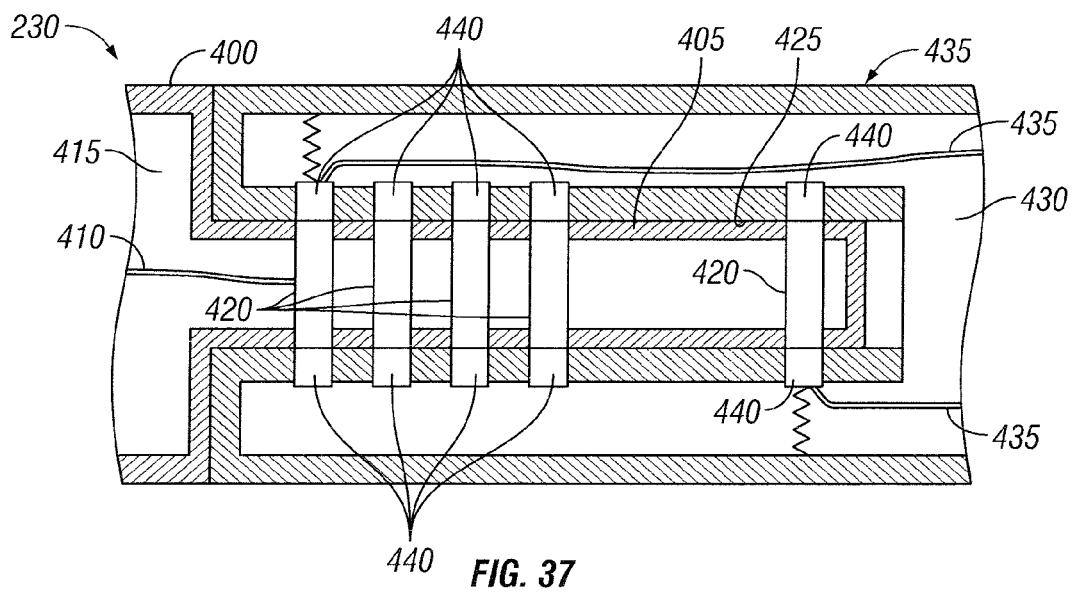

As previously mentioned, embodiments may comprise two or more two or more rigid-stem assemblies 220 coupled end-to-end to form a rigid streamer 50 (e.g., FIGS. 3 and 5) or a rigid lead-in 75 (e.g., FIG. 4). While a number of different techniques may be used for coupling the rigid-stem assemblies 220 to one another, end connector elements may be used at either end of the streamer assemblies for coupling. FIGS. 36 and 37 illustrate end connector elements that may be used in accordance with embodiments of the present invention for coupling rigid-stem assemblies 220. As illustrated, a male-type connector element 230 may be used that includes a base portion 400 and an extension 405 from the base portion 400. The male-type connector element 115 may further include conductors 410, such as electrical and optical conductors, in an interior portion 415 of the connector element 230. The extension 405 may include electrical contacts 420. A female-type connector element 235 may also be used that includes a socket 425. An interior portion 430 of the connector element 235 may also include conductors 435, such as electrical and optical conductors. The socket 425 may also include electrical contacts 440, for example. As best seen in FIG. 37, extension 405 of the male-type connector element 235 may be engaged in the socket 425 of the female-type connector element 235. Electrical and/or optical connection may be made between the connector elements 230, 235, for example, by using the electrical contacts 520, 540 in the extension 405 and the socket 425, respectively.

Figure 38:
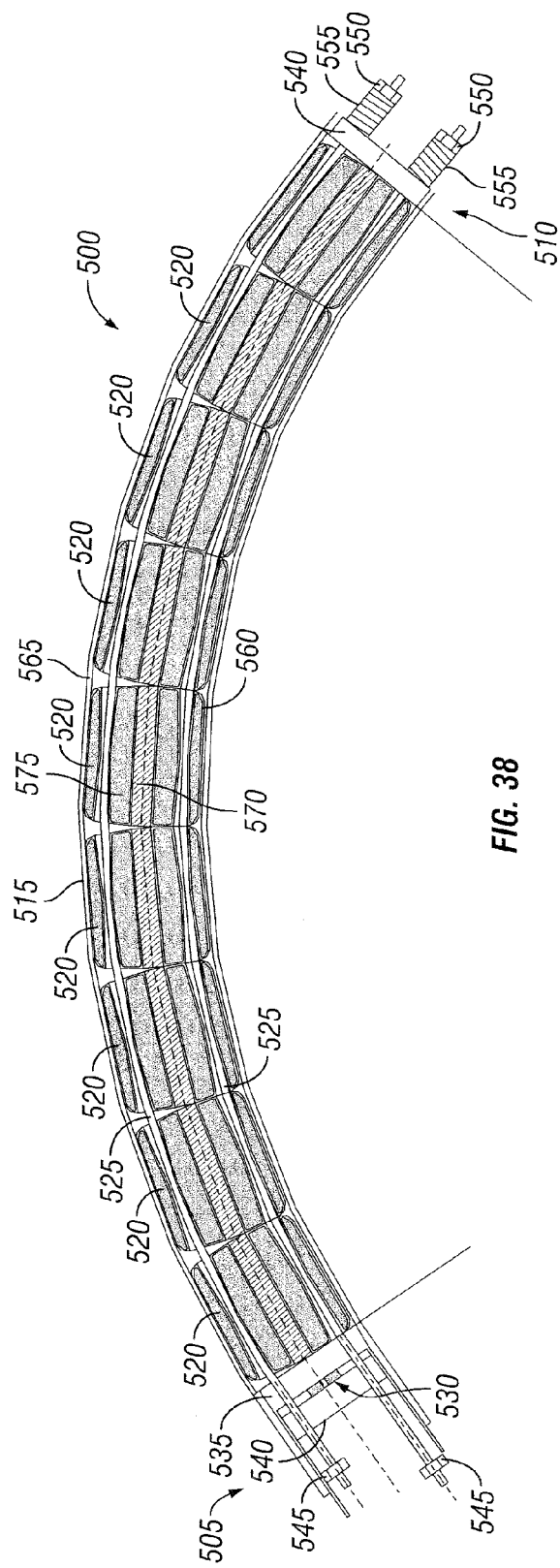
FIGS. 38 and 39 illustrate an example embodiment of rigid protracted geophysical equipment that comprises spacers that may be aligned in a rigid line to provide stiffness.
Figure 39:
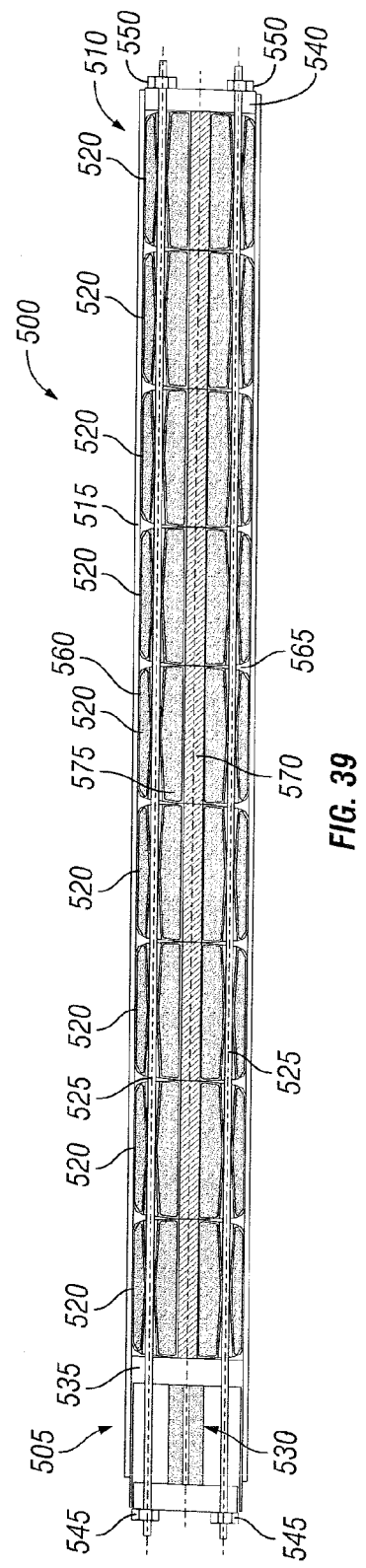

While the preceding discussion describes the use of rigid protracted geophysical equipment that comprise a plurality of interconnected rigid stems 115 for forming stiff geophysical equipment having control surfaces, other suitable techniques may be used to form the rigid protracted geophysical equipment that can be used in embodiments of the present invention. FIGS. 38 and 39 illustrate views of an equipment segment 500 having variable stiffness that can be used in forming a rigid protracted geophysical equipment. In some embodiments, a plurality of equipment segments 500 may be connected end-to-end to form the rigid protracted geophysical equipment. FIG. 38 illustrates the equipment segment 500 in a storable configuration. FIG. 39 illustrates the equipment segment 500 in an operational configuration in which the streamer has an increased stiffness, such as bending, inline, and/or torsional stiffness. The equipment segments 500 may be a structure for a number of items, including feed lines, gas lines, optical and/or electrical signals, power, external devices, geophysical sensors, tension sensors, and geophysical sources. Control surfaces, such as those previously discussed, may be incorporated into the equipment segments 500. The equipment segment 500 may have a length, for example, in a range of from about 10 meters to about 100 meters. Depending on the particular application, the rigid protracted geophysical equipment formed from the equipment segments 500 may have a length in a range of from about 200 meters to about 2000 meters or longer, for example.

In some embodiments, the equipment segment 500 may have a proximal (i.e., closer to survey vessel 10) end 505 and a distal (i.e., farther from survey vessel 10) end 510. In the illustrated embodiment, the equipment segment 500 includes a jacket 515, spacers 520, tension members 525, and a tensioning actuator 530. The jacket 515 generally may function as an exterior cover that at least partially covers and protects the internal components of the equipment segment 500 from water intrusion, for example. In some embodiments, the jacket 515 may be made from a flexible, acoustically transparent material, such as polyurethane. One or more plates may be located at or near the axial end of the jacket 515. For example, a proximal plate 535 may be located at or near the proximal end 505, and a distal plate 540 may be located at or near the distal end 510.

In some embodiments, the tension members 525 may extend generally the entire length of the equipment segment 500. In general, the tension members 525 may function to provide the equipment segment 500 with the ability to carry axial mechanical load, for example. For example, the tension members 525 may carry axial load along the length of the equipment segment 500. In some embodiments, the tension members 525 may be a metal, such as stainless steel, or high strength plastic materials. The tensions members 85 may be in the form of a cable or fiber robe, for example. At the proximal end 505, the tension members 525 may extend proximally beyond the proximal plate 525. The tension members 525 may also extend proximally beyond an actuator plate 540 which is located at the proximal end 505. As illustrated, from the proximal end 505, the tension members 525 may extend through the actuator plate 505, through the proximate plate 525, and then through the spacers 520 to the distal end 510. At the distal end 510, the tension members 525 may extend through the distal plate 540. In accordance with present embodiments, tension members 525 can move translation axially with respect to the actuator plate 540, the proximal plate 525, the spacers 520, and the distal plate 540. For example, in the storable configuration of the equipment segment 500, the tension members 525 may be allowed to slide in the spacers 520. Nuts (such as axial nuts 545 and distal nuts 550) or other suitable mechanical stops may be located at either axial end of the tension members 525. As illustrated, the axial end of the tension members 525 may be spring-loaded with springs 555 disposed on the tensions members 525 between the distal nuts 550 and the distal plate 540. The springs 555 may be compressed as tension is applied to the tension members 525 via the tensioning actuator 530.

As illustrated, the equipment segment 500 may further comprise a plurality of spacers 520 disposed along the length of the jacket 515. In accordance with present embodiments, the spacers 520 may be so densely packed that, when the tensioning actuator 530 applies tension to the tension members 525, the spacers 520 may be compressed together aligning the spacers 520 in a rigid line. The spacers 520 may be made from a foam material to provide buoyancy, for example. For example, the spacers 520 may include a foamed material that fills void spaces that comprises a foamed polyurethane or other suitable material. As illustrated, a large volume of the equipment segment 500 may be occupied by the spacers 520. For example, at least about 50% of the internal volume and as much as 90% or more of the internal volume of the equipment segment 500 and/or streamer 40 may be occupied by the spacers 520. Typically, oil or other suitable void-filling material occupies the interior volume of the equipment segment 500. However, because a high volume of the equipment segment 500 may be occupied by the spacers 520, less oil or other void-filling material can be used, thus minimizing potential problems that may be caused by leakage. In addition, foamed materials such as rigid foams can deal with the pressures of more than a few meters while also giving more than 4 times the buoyancy of some void-filling materials, such as oils. Moreover, the interior of the spacers 520 may be formed with closed, hollow cavities so that a leak in the jacket 515, for example, would not necessarily fill the entire volume.

In some embodiments, the spacers 520 may each have a may have a protective outer covering 560 or skin. The outer covering 560 generally may function as exterior cover that protects the internal components of the spacer 520 from water intrusion, for example. In some embodiments, the outer covering 560 may be made from a flexible, acoustically transparent material, such as polyurethane. In some embodiments, the outer covering 560 may have a thickness in a range of from about 0.5 mm to about 5 mm. In one particular embodiment, the outer covering 560 may have a thickness of about 1 mm. As illustrated, the spacer 520 may further have channels 565 for the tension members 525. In the illustrated embodiment, the tension members 525 extend through the channels 565. As previously mentioned, the tension members 525 may be allowed to freely move in the channels 565. As further illustrated, the spacer 520 may further comprise a compression member, such as central core 570. In the illustrated embodiment, the central core 570 is located in the middle of the spacer 520 and has exterior surfaces on either axial end of the spacer 520. The exterior surfaces of the central core 570 may engage adjoining exterior surfaces of adjacent spacers 520 when compressed together in the operational configuration. The central core 570 may comprise a material that can withstand the high axial loads that can be placed on the spacer 520 in the operational configuration. Void spaces in the spacer 520 may be filled with a foamed material 575, which may comprise a foamed polyurethane or other suitable foam. While not shown, the spacer 520 may further comprise channels for conductor cables and cavities for geophysical sensors, transducers, and other equipment used for geophysical data acquisition. Modifications may be made to the spacers 520 shown on FIGS. 38 and 39 accommodate these additional components. For example, additional channels may be needed through the spacer 520 for the conductor cables while additional cavities may be needed for incorporation of other components. In addition, openings toward pressure sensitive area (e.g., the outer covering 565) may be need for geophysical sensors such as hydrophones to pick up pressure signals in the water. Moreover, embodiments (not illustrated) may replace the central core 570 with a structure that provides a sealed and pressure-free space inside. In some embodiments, this structure may be an eggshell or cylindrically shaped structure. However, other suitable configurations for the structure may also be suitable.

In some embodiments, the tensioning actuator 530 may be located at the proximal end 505 of the equipment segment 500. The tensioning actuator 530 may generally be configured to apply tension other than towing tension to the tension members 525. As illustrated, the tensioning actuator 530 may be coupled to the actuator plate 540. The tensioning actuator 530 may cause the actuator plate 540 to move axially outward into engagement with the proximal bolts 545 or other mechanical stop on the tension members 525. The actuator plate 540 transfers mechanical force from tensioning actuator 530 to the tension members 525. One example of a suitable tensioning actuator 530 is a linear drive that generates motion in a straight line to move the actuator plate 540. Other suitable actuated drives may also be used for applying tension to the tension members 525 in accordance with embodiments of the present invention.

In accordance with present embodiments, the equipment segment 500 may have a variable stiffness. For example, the equipment segment 500 may have a storable configuration in which the streamer may be deployed and stored on a drum onboard a survey vessel (e.g., survey vessel 10 on FIG. 3). FIG. 38 illustrates the equipment segment 500 in the storable configuration. In the storable configuration, the tensions members 525 may be allowed to slide with respect to the spacers 520. The spacers 520 may be packed closely in the equipment segment 500, but have enough gaps in between for the equipment segment 500 to bend. As best seen in FIG. 38, the equipment segment 500 may freely bend in the storable configuration, for example, to wound onto a drum. At a desired time, the equipment segment 500 may be placed in the operational configuration in which the equipment segment 500 has an increased stiffness. In the operational configuration, the equipment segment 500 is characterized as being rigid in that it has as bending, torsion, and/or inline stiffness than can be maintained for considerable lengths, for example, up to about 10 meters, about 50 meters, about 100 meters, or even longer when assembled end-to-end with other streamer segments 60 in the operational configuration, for example. In some embodiments, the equipment segment 500 in the operation configuration may having a bending stiffness of 700 Newton-square meters ("Nm$^2$") or greater. FIG. 39 illustrates the equipment segment 500 in the operational configuration. In some embodiments, the spacers 520 may be so densely packed that, when the tensioning actuator 530 applies tension to the tension members 525, the spacers 520 may be compressed together aligning the spacers 520 in a rigid line, increasing the bending stiffness of the equipment segment 500. The spacers 520 in compression and the tension members 525 in compression should contributed to the bending stiffness of the equipment segment 500.

In the illustrated embodiment, the tensioning actuator 530 may be used to apply tension to the tension members 525 for placement of the equipment segment 500 into the operational configuration. The tensioning actuator 530 may cause the actuator plate 540 to move axially outward into engagement with the proximal bolts 545 or other mechanical stop on the tension members 525. In this manner, the actuator plate 540 transfers mechanical force from tensioning actuator 530 to the tension members 525 causing the tension members 525 to move axially. As the tension members 525 move, the distal nuts 550 on the tensions members 85 engage the distal plate 540 causing the distal plate 540 to apply force onto the spacers 520 compressing the spacers 520 between the distal plate 540 and the axial plate 95. Compression of the spacers 520 aligns the spacers 520 into a rigid line. Other suitable techniques for placing the spacers 520 into a rigid line may also be used in accordance with embodiments of the present invention.

Figure 40:
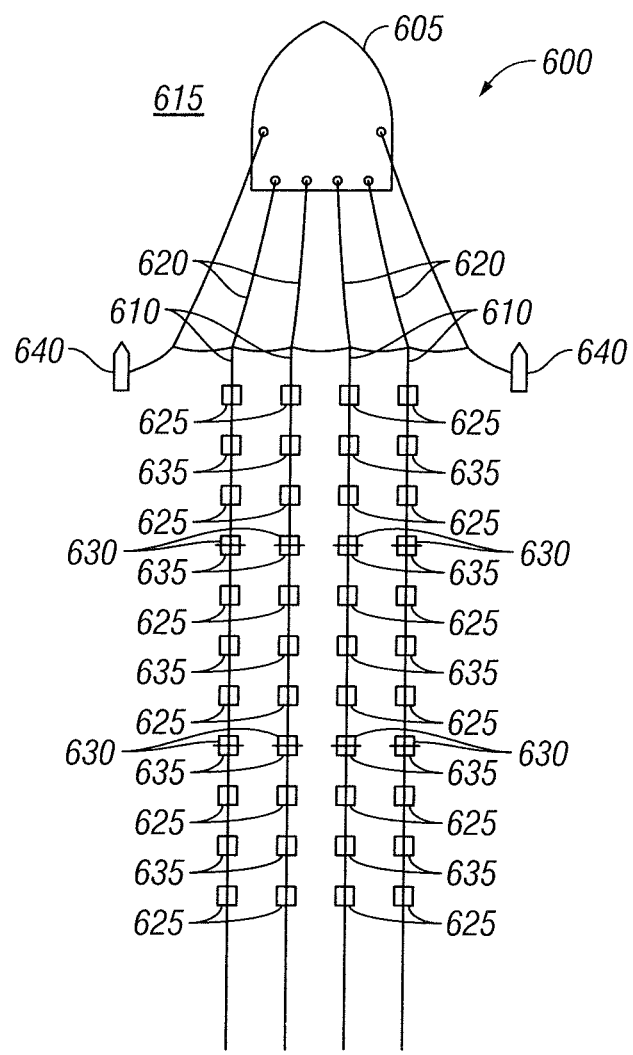
FIG. 40 illustrates a conventional seismic survey system.

In contrast to systems that use rigid protracted geophysical equipment comprising a plurality of interconnected rigid stems in a marine survey, FIG. 40 illustrates a conventional seismic survey system 600. As illustrated, the seismic survey system 600 may include a survey vessel 605 towing a plurality of sensor streamers 610 through a body of water 615. Lead-in lines 620 may be used to couple the sensor streamers 610 to the survey vessel 605. Each of the sensor streamers 610 may include sensors 625. The sensor streamers 605 may also include lateral force and depth ("LFD") control devices 630 (e.g., "birds") and associated acoustic range sensing devices 635, which can be disposed at selected positions along the sensor streamers 605 collocated with the LDF devices 630 or at separate positions. Spreading devices 640, such as doors or paravanes, may be used to maintain lateral separation of the sensor streamers 605. Unlike the system illustrated by FIG. 29, embodiments of the present invention that use rigid-stem assemblies in a survey may contain almost no buoys, doors, paravanes, chains or extra ropes, or LFD devices, such as birds. For example, a seismic survey may be performed that only has the desired lights and antennas above the water.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the tell is in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. An apparatus for use in a marine geophysical survey comprising:
   rigid protracted geophysical equipment having a ratio of length to a largest dimension of width or height of about 1000:1 or more, wherein the rigid protracted geophysical equipment comprises control surfaces for controlling movement of the rigid protracted geophysical equipment when towed through a body of water; and
   wherein the rigid geophysical equipment comprises a plurality of rigid stems that are interconnected and each comprise a stem body defining one or more interior chambers, wherein the rigid stems each comprise a length of about 1.5 meters to about 50 meters.

2. The apparatus of claim 1, wherein the rigid protracted geophysical equipment is operable as at least one of: a lead-in coupling a streamer to a survey vessel, a streamer bearing a sensor, or a source cable for towing a geophysical source.

3. The apparatus of claim 1, wherein the rigid protracted geophysical equipment comprises an equipment section that comprises an outer covering and a plurality of spacers disposed in the outer covering, wherein the spacers are configured to align in a rigid line.

4. The apparatus of claim 1, wherein the control surfaces comprise at least one surface selected from the group consisting of a wing, an aileron, and a rudder.

5. The apparatus of claim 1, wherein the control surfaces comprise wings mounted to the rigid protracted geophysical equipment.

6. The apparatus of claim 5, wherein each of the wings is stowable in a corresponding wing cavity in the rigid protracted geophysical equipment, each of the wings being operable to extend from the corresponding wing cavity.

7. The apparatus of claim 6, wherein the rigid protracted geophysical equipment comprises sleeves that cover each wing cavity, the sleeves being slidably movable on the rigid protracted geophysical equipment.

8. The apparatus of claim 7, wherein one or more of the wings is configured to slide to different positions in the wing cavity to adjust control of wing angle, wherein the wing cavity is in the form of an angled groove.

9. The apparatus of claim 1, wherein the rigid protracted geophysical equipment has a maximum width of about 100 millimeters, a maximum height of about 100 millimeters, and a length of about 100 meters or longer.

10. The apparatus of claim 9, wherein the rigid protracted geophysical equipment has a length of from about 200 meters to about 16000 meters.

11. The apparatus of claim 1, wherein the rigid protracted geophysical equipment has an operational configuration with a bending stiffness of 700 Newton-square meters or greater over a distance of at least 25 meters.

12. The apparatus of claim 1, wherein the rigid protracted geophysical equipment is a sensor streamer that is not in the form of a cable.

13. A marine survey system, comprising:
a survey vessel; and
rigid protracted geophysical equipment being configured to be towed from the survey vessel, wherein the rigid protracted geophysical equipment has a length of from about 200 meters to about 16000 meters and a ratio of length to a largest dimension of width or height of about 1000:1 or more, and wherein the rigid protracted geophysical equipment comprises control surfaces for controlling movement of the rigid protracted geophysical equipment when towed from the survey vessel; and
wherein the rigid geophysical equipment comprises a plurality of rigid stems that are interconnected and each comprise a stem body defining one or more interior chambers, wherein the rigid stems each comprise a length of about 1.5 meters to about 50 meters.

14. The system of claim 13, wherein the rigid protracted geophysical equipment is operable as at least one of: a lead-in coupling a streamer to the survey vessel, a streamer bearing a sensor, or a source cable for towing a geophysical source.

15. The system of claim 13, wherein the rigid protracted geophysical equipment comprises an equipment section that comprises an outer covering and a plurality of spacers disposed in the outer covering, wherein the spacers are operable to align in a rigid line.

16. The system of claim 13, wherein the control surfaces comprise wings mounted to the rigid protracted geophysical equipment.

17. The system of claim 16, wherein each of the wings is stowable in a corresponding wing cavity in the rigid protracted geophysical equipment, each of the wings being operable to extend from the corresponding wing cavity.

18. The system of claim 16, wherein the rigid protracted geophysical equipment has a maximum width of about 100 millimeters and a maximum height of about 100 millimeters.

19. The system of claim 16, wherein the rigid protracted geophysical equipment has an operational configuration with a bending stiffness of 700 Newton-square meters or greater over a distance of at least 25 meters.

20. The system of claim 13, wherein the rigid protracted geophysical equipment is a sensor streamer that is not in the form of a cable.

21. A geophysical survey method comprising:
towing a rigid protracted geophysical equipment from a survey vessel in a body of water, wherein the rigid protracted geophysical equipment has a ratio of length to a largest dimension of width or height of about 1000:1 or more, wherein the rigid geophysical equipment comprises a plurality of rigid stems that are interconnected and each comprise a stem body defining one or more interior chambers wherein the rigid stems each comprise a length of about 1.5 meters to about 50 meters;
controlling movement of the rigid protracted geophysical equipment using one or more control surfaces on the rigid protracted geophysical equipment; and
either (1) detecting a geophysical signal with a sensor towed by the survey vessel, and/or (2) activating a geophysical source that is towed by the survey vessel.

22. The method of claim 21, further comprising coupling a plurality of rigid stems end-to-end to form the rigid protracted geophysical equipment.

23. The method of claim 21, further comprising aligning a plurality of spacers in the rigid protracted geophysical equipment in a rigid line.

24. The method of claim 21, wherein the control surfaces comprises wings, the method further comprising deploying the wings to selectively position the rigid protracted geophysical equipment in the body of water.

25. The method of claim 24, wherein the deploying comprises opening sleeves on the rigid protracted geophysical equipment.

26. The method of claim 21, further comprising adjusting wing angle of a wing on the rigid protracted geophysical equipment by positioning the wing in an angled groove in the rigid protracted geophysical equipment.

27. The method of claim 21, wherein the rigid protracted geophysical equipment functions as at least one of: a lead-in coupling a streamer to the survey vessel, a streamer bearing the sensor, or a source cable for towing the geophysical source.

* * * * *